US010582263B2

(12) United States Patent
Warrick et al.

(10) Patent No.: US 10,582,263 B2
(45) Date of Patent: Mar. 3, 2020

(54) USER PROFILE SERVER TO PROVIDE TAILORED EXPERIENCE AT HOSPITALITY LOCATIONS WITHIN PREDETERMINED DISTANCE FROM THE USER

(71) Applicant: Guest Tek Interactive Entertainment Ltd., Calgary (CA)

(72) Inventors: Peter S. Warrick, Calgary (CA); Arnon Levy, Calgary (CA); Lindsey M. Carriere, Calgary (CA); Darren T. Ziebart, Calgary (CA); Joseph A. Kullos, Calgary (CA); Diego Fontes, Calgary (CA); Andrew T. MacMillan, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

(21) Appl. No.: 16/280,124

(22) Filed: Feb. 20, 2019

(65) Prior Publication Data

US 2019/0182546 A1  Jun. 13, 2019

Related U.S. Application Data

(63) Continuation of application No. 15/883,755, filed on Jan. 30, 2018, now Pat. No. 10,257,574, which is a (Continued)

(30) Foreign Application Priority Data

Sep. 10, 2010 (CA) .................................... 2714224
Sep. 10, 2010 (CA) .................................... 2714227

(51) Int. Cl.
*H04N 21/45* (2011.01)
*H04N 7/10* (2006.01)
(Continued)

(52) U.S. Cl.
CPC ..... *H04N 21/4532* (2013.01); *H04L 12/1435* (2013.01); *H04L 67/12* (2013.01);
(Continued)

(58) Field of Classification Search
CPC ............... H04N 7/106; H04N 21/2402; H04N 21/2143; H04N 21/4532; H04N 21/2668;
(Continued)

(56) References Cited

U.S. PATENT DOCUMENTS 6,622,307 B1    9/2003  Ho
6,823,188 B1 *  11/2004  Stern .................... G08G 1/0962
                                                 455/41.2
(Continued)

FOREIGN PATENT DOCUMENTS

CA    2714224 C    10/2011
CA    2714227 C    10/2011
(Continued)

OTHER PUBLICATIONS

WorldMate, "WorldMate Live", undated, downloaded from http://www.worldmate.com/features/mobile-itinerary.php on Aug. 9, 2010 (1 page).

*Primary Examiner* — Chenea Davis
(74) *Attorney, Agent, or Firm* — ATMAC Patent Services Ltd.; Andrew T. MacMillan

(57) ABSTRACT

A user profile server stores a user profile corresponding to a user identifier. The user profile includes user-specific information of a user associated with the user identifier. The server receives a location update associated with the user identifier, the location update representing a current location of the user associated with the user identifier and determine a hospitality location within a predetermined distance of the current location represented by the location update. The server communicates at least one of the user-specific infor-
(Continued)

mation to a controller associated with the hospitality location thereby allowing the controller to provide the user-tailored experience to the user according to the at least one of the user-specific information received from the user-profile server. In this way, users who travel during unplanned trips or to locations that do not accept reservations may benefit from user-tailored experiences.

20 Claims, 13 Drawing Sheets

Related U.S. Application Data continuation of application No. 15/418,758, filed on Jan. 29, 2017, now Pat. No. 9,918,130, which is a continuation of application No. 15/047,449, filed on Feb. 18, 2016, now Pat. No. 9,596,509, which is a continuation of application No. 14/708,847, filed on May 11, 2015, now Pat. No. 9,301,001, which is a continuation of application No. 14/202,193, filed on Mar. 10, 2014, now Pat. No. 9,038,112, which is a continuation of application No. 13/155,671, filed on Jun. 8, 2011, now Pat. No. 8,713,612.

(60) Provisional application No. 61/381,756, filed on Sep. 10, 2010, provisional application No. 61/356,315, filed on Jun. 18, 2010.

(51) Int. Cl.
| | |
|---|---|
| *H04N 7/18* | (2006.01) |
| *H04N 21/214* | (2011.01) |
| *H04N 21/2668* | (2011.01) |
| *H04N 21/2665* | (2011.01) |
| *H04N 21/426* | (2011.01) |
| *H04N 21/472* | (2011.01) |
| *H04N 21/442* | (2011.01) |
| *H04N 21/61* | (2011.01) |
| *H04L 12/14* | (2006.01) |
| *H04L 29/08* | (2006.01) |
| *H04N 21/24* | (2011.01) |
| *H04L 29/12* | (2006.01) |

(52) U.S. Cl.
CPC .......... *H04L 67/146* (2013.01); *H04L 67/306* (2013.01); *H04N 7/106* (2013.01); *H04N 7/18* (2013.01); *H04N 21/2143* (2013.01); *H04N 21/2402* (2013.01); *H04N 21/2665* (2013.01); *H04N 21/2668* (2013.01); *H04N 21/42607* (2013.01); *H04N 21/44222* (2013.01); *H04N 21/472* (2013.01); *H04N 21/6193* (2013.01); *H04L 61/6022* (2013.01)

(58) Field of Classification Search
CPC ......... H04N 21/44222; H04N 21/6193; H04N 21/42607; H04N 21/2665; H04N 21/472; H04N 7/18; H04L 12/1435; H04L 61/6022; H04L 67/12; H04L 67/146; H04L 67/306
See application file for complete search history.

(56) References Cited

U.S. PATENT DOCUMENTS

| | | | |
|---|---|---|---|
| 6,985,070 B1 | 1/2006 | Parker | |
| 7,185,355 B1 | 2/2007 | Ellis et al. | |
| 7,822,635 B1* | 10/2010 | Brown | G06Q 30/02 |
| | | | 705/14.1 |
| 8,045,557 B1 | 10/2011 | Sun | |
| 8,434,111 B2 | 4/2013 | Levy et al. | |
| 8,578,418 B2 | 11/2013 | Levy et al. | |
| 8,713,612 B2 | 4/2014 | Levy et al. | |
| 9,038,112 B2 | 5/2015 | Warrick et al. | |
| 9,301,001 B2 | 3/2016 | Warrick et al. | |
| 9,596,509 B2 | 3/2017 | Warrick et al. | |
| 9,918,130 B2 | 3/2018 | Warrick et al. | |
| 10,257,574 B2 | 4/2019 | Warrick et al. | |
| 2002/0056118 A1 | 5/2002 | Hunter et al. | |
| 2002/0184630 A1 | 12/2002 | Nishizawa et al. | |
| 2002/0198991 A1 | 12/2002 | Gopalakrishnan et al. | |
| 2003/0061077 A1 | 3/2003 | Sagar | |
| 2003/0061610 A1* | 3/2003 | Errico | G11B 27/105 |
| | | | 725/46 |
| 2003/0067554 A1 | 4/2003 | Klarfeld et al. | |
| 2003/0149576 A1* | 8/2003 | Sunyich | G06Q 10/02 |
| | | | 705/5 |
| 2003/0220994 A1 | 11/2003 | Zhu | |
| 2005/0125835 A1 | 6/2005 | Wei | |
| 2005/0181734 A1 | 8/2005 | Coutts et al. | |
| 2005/0283791 A1 | 12/2005 | McCarthy et al. | |
| 2006/0277576 A1 | 12/2006 | Acharya et al. | |
| 2007/0050083 A1* | 3/2007 | Signorelli | G06Q 20/20 |
| | | | 700/241 |
| 2007/0174873 A1 | 7/2007 | Griggs | |
| 2007/0199019 A1 | 8/2007 | Angiolillo et al. | |
| 2007/0299976 A1 | 12/2007 | Zafar et al. | |
| 2008/0189360 A1* | 8/2008 | Kiley | H04L 67/306 |
| | | | 709/203 |
| 2008/0200154 A1 | 8/2008 | Maharajh et al. | |
| 2009/0059962 A1 | 3/2009 | Schmidt et al. | |
| 2009/0133079 A1 | 5/2009 | Li et al. | |
| 2010/0042517 A1 | 2/2010 | Paintin et al. | |
| 2010/0082681 A1 | 4/2010 | Adimatyam et al. | |
| 2010/0091968 A1 | 4/2010 | Reid | |
| 2010/0115113 A1 | 5/2010 | Short et al. | |
| 2010/0169475 A1 | 7/2010 | Woundy et al. | |
| 2010/0191551 A1 | 7/2010 | Drance et al. | |
| 2011/0307930 A1* | 12/2011 | Rouse | H04N 21/2387 |
| | | | 725/98 |
| 2013/0074106 A1 | 3/2013 | Hayashi et al. | |
| 2016/0219333 A1 | 7/2016 | Warrick et al. | |

FOREIGN PATENT DOCUMENTS

| | | |
|---|---|---|
| WO | 2005065166 | 7/2005 |
| WO | 2006033841 | 3/2006 |

* cited by examiner

Location and Device List 300

| Location Identifier (302) | General Location Description (304) | Device(s) IP Addresses (306) |
|---|---|---|
| 3 | Montreal shuttle service | 13.125.99.10:8080, 231.22.22.58 |
| 4 | Montreal airport | 42.37.149.91 |
| 33 | Hotel Okinawa | 32.55.217.201 |
| 85 | Okinawa airport | 33.87.62.111 |
| 212 | Vancouver airport | 62.35.11.194 |
| 235 | Japan ocean liner | 31.59.98.33 |
| 401 | Hawaii airport | 34.65.29.34 |
| 621 | Galactic airlines | 202.34.43.1:87, 202.34.43.19 |
| 675 | Asian airlines | 211.21.77.39 |
| 701 | Taipei airport | 201.35.11.111 |
| 743 | Hotel Japan | 31.42.9.246 |
| 765 | Canada airlines | 42.99.38.111:8080 |
| 1023 | Formosa hotel | 202.38.52.1:8329 |
| ... | | |
| 3001 | Montreal limousines | 13.33.51.239 |

FIG. 3

Trip plan for user identifier: #3,453,292

| Sequence | Date | Location Description | Location Identifier |
|---|---|---|---|
| 1 | August 8, 2010 | Airport Shuttle Trip #14 | 3 |
| 2 | August 8, 2010 | Montreal Airport Terminal 1 | 4 |
| 3 | August 8, 2010 | Galactic flight #23 | 621 |
| 4 | August 9, 2010 | Galactic flight #78 | 621 |
| 5 | August 9, 2010 | Hawaii Airport Terminal 2 | 401 |
| 6 | August 9, 2010 | Hotel Japan | 743 |
| 7 | August 10, 2010 | Hotel Japan | 743 |
| 8 | August 11, 2010 | Japan ocean liner trip #9A | 235 |
| 9 | August 11, 2010 | Hotel Okinawa | 33 |
| 10 | August 12, 2010 | Hotel Okinawa | 33 |
| 11 | August 13, 2010 | Okinawa airport terminal 1 | 85 |
| 12 | August 13, 2010 | Asia Air flight #8 | 675 |
| 13 | August 13, 2010 | Formosa Hotel | 1023 |
| 14 | August 14, 2010 | Formosa Hotel | 1023 |
| 15 | August 15, 2010 | Taipei airport terminal 1 | 701 |
| 16 | August 15, 2010 | Asian Air flight #12 | 765 |
| 17 | August 15, 2010 | Vancouver airport terminal 2 | 212 |
| 18 | August 15, 2010 | Canada Air flight #5 | 123 |
| 19 | August 16, 2010 | Limousine service | 3001 |
| 20 | August 8-16, 2010 | User's mobile phone | on user profile |

FIG. 4

Asian Airlines Personalized Seat-back Entertainment

Cathy,

We're sorry. For safety reasons the seat-back entertainment system must now be turned off.

Spiderman has been automatically bookmarked at your current position. You may finish it at your hotel.

Welcome to Hotel Formosa, Cathy

Resume unfinished movie:

- Spiderman (0:23 remaining) — 602
- Faster (1:12 remaining) — 604
- Unstoppable (0:42 remaining) — 606

FIG. 6

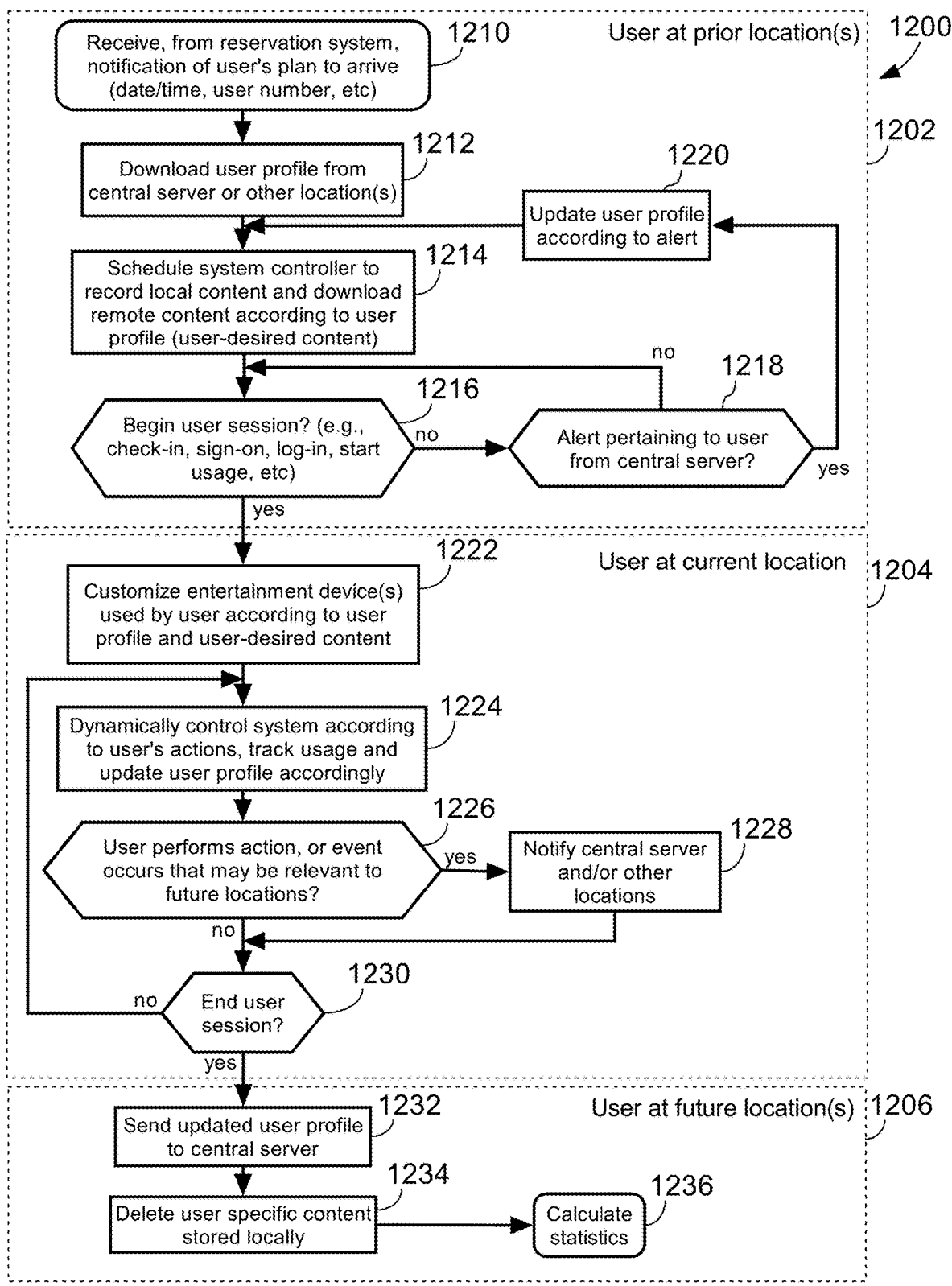
FIG. 12 - Actions taken by entertainment device controller

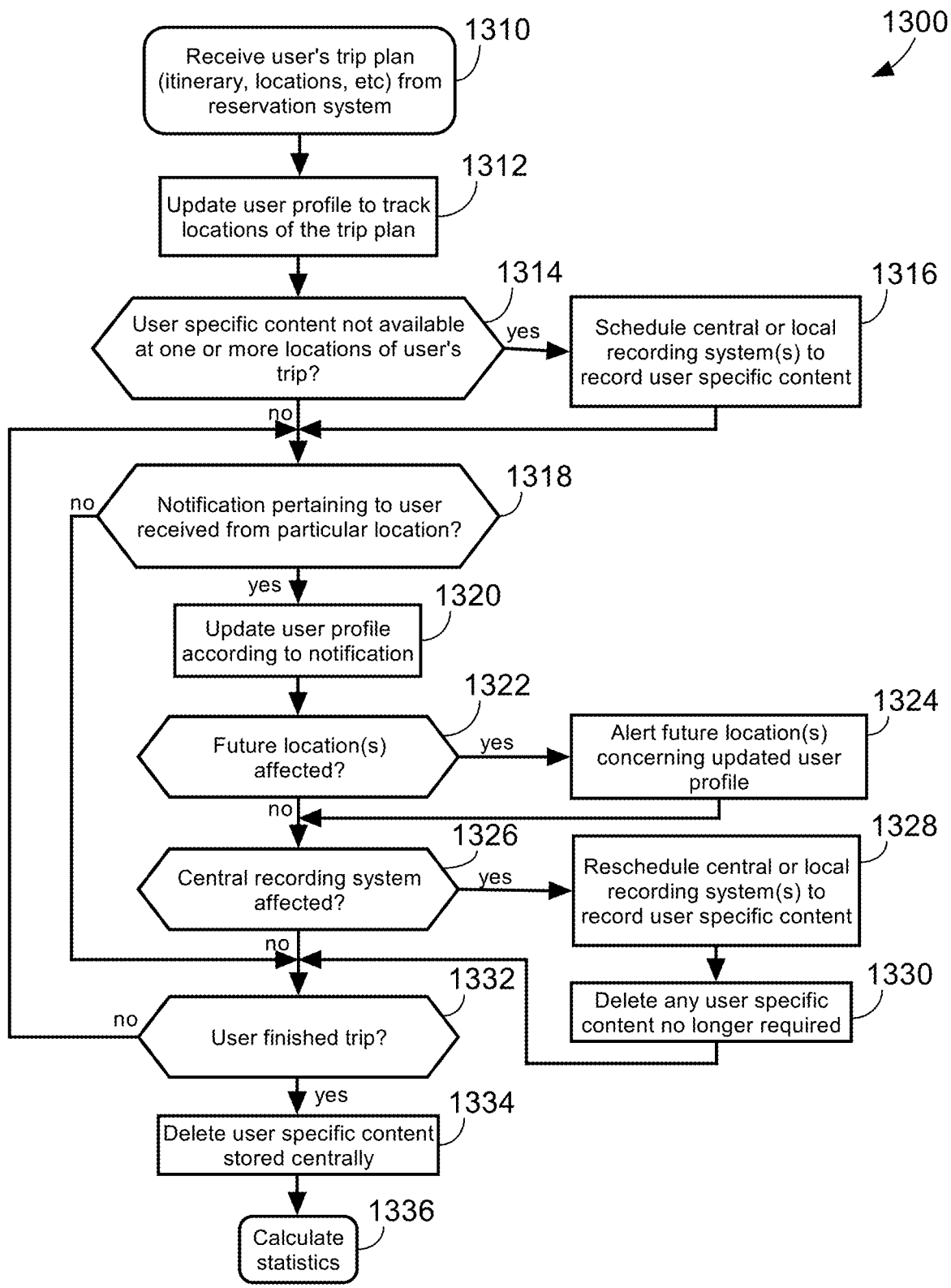
FIG. 13 - Actions taken by user-profile server

USER PROFILE SERVER TO PROVIDE TAILORED EXPERIENCE AT HOSPITALITY LOCATIONS WITHIN PREDETERMINED DISTANCE FROM THE USER

CROSS-REFERENCE TO RELATED APPLICATIONS

This application is a continuation of U.S. patent application Ser. No. 15/883,755 filed Jan. 30, 2018; which is a continuation of U.S. patent application Ser. No. 15/418,758 filed Jan. 29, 2017; which is a continuation of U.S. patent application Ser. No. 15/047,449 filed Feb. 18, 2016; which is a continuation of U.S. patent application Ser. No. 14/708,847 filed May 11, 2015; which is a continuation of U.S. patent application Ser. No. 14/202,193 filed Mar. 10, 2014; which is a continuation of U.S. patent application Ser. No. 13/155,671 filed Jun. 8, 2011; which claims the benefit of U.S. Provisional Patent Application No. 61/356,315 filed Jun. 18, 2010; U.S. Provisional Patent Application No. 61/381,756 filed Sep. 10, 2010; Canadian Patent Application No. 2,714,224 filed Sep. 10, 2010; and Canadian Patent Application No. 2,714,227 filed Sep. 10, 2010. All of the above applications are incorporated herein by reference.

BACKGROUND OF THE INVENTION

1. Field of the Invention

The invention pertains generally to hospitality media systems. More specifically, the invention relates to providing a tailored experience at hospitality locations within a predetermined distance of a user.

2. Description of the Related Art

Travel is popular both as a recreational activity such as tourism and as a corporate activity such as business trips. One problem with travelling for either pleasure or business, however, is what to do during all the inevitable "downtime" that is associated with travelling. Examples of typical downtime include periods waiting for departure at airports, bus terminals, ferry docks, or train stations; waiting for arrival while on an airplane, car, bus, boat, or train; waiting at transfer points for a next departure; killing time during layovers and overnight stays; waiting for weather to permit travel; waiting for tours to start; waiting for meetings to start; and recovering from jet lag, time zone changes, illness, food differences, and the general fatigue of coping in a new environment.

Travellers often carry portable electronic devices that, in addition to other functions, provide for personal entertainment during downtime. Examples include mobile phones; personal music players; portable video players; digital cameras; and laptop, notebook, and tablet computers; etc. Additionally, to keep travellers occupied and provide entertainment during waiting periods, electronic entertainment devices and systems are provided in guest-facing locations throughout the travel and hospitality industries. Examples include public televisions; Internet kiosks and WiFi access points; personal music and video players mounted in seatbacks on airplanes, busses, and trains; video games consoles; high definition audio-visual devices in hotel rooms and ocean liner cabins; etc.

One problem with providing entertainment devices and systems for travellers is there is a lack of information regarding content that is desired by travellers at any given time. Rankings may help property owners guess the desired content, but, with the increasing number of global travellers, no matter what content is available at a certain location, there is bound to be at least one user who wants more or different options. Another issue is the disjoint nature of all available entertainment content. Content available at a first location such as on an airplane is often different than that available at a second location such as a foreign hotel, and both may not be content a user enjoys. Although in certain situations it may be enjoyable for a traveller to be exposed to new or different content, travellers generally prefer familiar content or at least content in an understandable language, which may or may not be available when visiting a foreign country. Although most international hotels and resorts try to provide at least some content in English and other widely spoken languages to cover the majority of users, at best, this solution only satisfies the travellers who fall into the targeted "majority". For this reason, guests often rely on content they have brought with them on personal devices.

In order to meet increasing guest expectations, hospitality locations try to provide a wide range of multimedia entertainment content such as specialized channels in a variety of different languages from a plurality of content sources. Purchasing content from local providers including cable/phone companies is one option. Satellite and Internet distribution are other options. Additionally, some content such as feature movies may be stored on hard drives or other storage media and mailed to hotels or other locations in advance. However, for an international destination with a variety of guests, local content providers may not provide the desired content in the required languages. The same drawback may also apply to satellite providers available in the region, and satellite reception requires additional hardware such as the installation of one or more satellite dishes and receivers for each desired channel. News broadcasts, weather, special reports, sports events, and financial information are examples of content that is best provided in real-time. Internet distribution solves some of these problems; however, the costs of purchasing bandwidth sufficient to stream all possible content in real-time often make this option cost prohibitive.

BRIEF SUMMARY OF THE INVENTION

According to an exemplary embodiment of the invention there is provided a hospitality media system providing a user-tailored entertainment experience across different hospitality establishments. The hospitality media system includes a user profile server coupled to a wide area network; a first local system controller controlling access between the wide area network and a first local area network located at a first hospitality establishment; and a second local system controller controlling access between the wide area network and a second local area network located at a second hospitality establishment. The first local system controller is operable to track a bandwidth usage statistic according to bandwidth utilized by a guest device having a particular device identifier while the guest device is accessing the wide area network from the first local area network. The first local system controller is further operable to update a user profile corresponding to the particular device identifier on the user profile server with the bandwidth usage statistic. The second local system controller is operable to receive details of the user profile in response to a user corresponding to the user profile checking in to the second hospitality establishment. The second local system controller is further operable to detect the guest device having the particular device identifier requesting access to the wide area network from the second local area network and automatically grant the guest device access to the wide area network according to the details of the user profile retrieved from the user profile server. The second local system controller is further operable to send a message to the guest device via the second local area network when the bandwidth usage statistic exceeds a predetermined level, the message suggesting a user of the guest device to upgrade to a faster speed tiered bandwidth option available for accessing the wide area network at the second hospitality establishment.

According to another exemplary configuration of the invention there is provided a method of providing a user-tailored entertainment experience across different hospitality establishments. The method includes providing a user profile server coupled to a wide area network; controlling access between the wide area network and a first local area network located at a first hospitality establishment by a first local system controller; and controlling access between the wide area network and a second local area network located at a second hospitality establishment by a second local system controller. The method further includes tracking a bandwidth usage statistic by the first local system controller according to bandwidth utilized by a guest device having a particular device identifier while the guest device is accessing the wide area network from the first local area network; updating a user profile corresponding to the particular device identifier on the user profile server with the bandwidth usage statistic by the first local system controller; and receiving, by the second local system controller, details of the user profile in response to a user corresponding to the user profile checking in to the second hospitality establishment. The method further includes detecting, by the second local system controller, the guest device having the particular device identifier requesting access to the wide area network from the second local area network; automatically granting the guest device access to the wide area network by the second local system controller according to the details of the user profile retrieved from the user profile server; and sending a message from the second local system controller to the guest device via the second local area network when the bandwidth usage statistic exceeds a predetermined level, the message suggesting a user of the guest device to upgrade to a faster speed tiered bandwidth option available for accessing the wide area network at the second hospitality establishment.

According to yet another exemplary configuration of the invention there is provided an apparatus for controlling access between a wide area network and a local area network of a hospitality establishment. The apparatus includes a first network interface coupled to the wide area network; a second network interface coupled to the local area network; a memory device storing software instructions; and one or more processors coupled to the memory device, the first network interface, and the second network interface. By the one or more processors executing the software instructions loaded from the memory device, the one or more processors are operable to: access a user profile server via the wide area network in order to receive a bandwidth usage statistic associated with a particular device identifier in response to a user corresponding to the user profile checking in to the hospitality establishment; detecting a guest device having the particular device identifier requesting access to the wide area network from the local area network, the bandwidth usage statistic corresponding to previous bandwidth utilized by the guest device having the particular device identifier while the guest device was accessing the wide area network from a different hospitality establishment; automatically granting the guest device access to the wide area network according to the details of the user profile retrieved from the user profile server; and sending a message to the guest device via the local area network when the bandwidth usage statistic exceeds a predetermined level, the message suggesting a user of the guest device to upgrade to a faster speed tiered bandwidth option available for accessing the wide area network at the hospitality establishment.

According to yet another exemplary configuration of the invention there is provided a method of providing a user-tailored entertainment experience across different entertainment devices. The method is performed by a user-profile server coupled to a network. The method includes storing a user profile corresponding to a user identifier and receiving via the network a media content preference. The media content preference is associated with the user identifier and pertaining to a configuration made by a user while utilizing a first entertainment device. The method further includes updating the user profile to include the media content preference and communicating via the network at least the media content preference to a controller of a second entertainment device to thereby allow the second entertainment device to store media content according to the media content preference prior to the user beginning to utilize the second entertainment device.

According to yet another exemplary configuration of the invention there is provided a user-profile server for providing a user-tailored entertainment experience across different entertainment devices. The user-profile server includes a network connection for coupling the user-profile server to a network, a storage device, and one or more processors coupled to the storage device and the network connection. By the one or more processors executing software instructions loaded from the storage device, the one or more processors are configured to store a user profile corresponding to a user identifier in the storage device and receive via the network a media content preference. The media content preference is associated with the user identifier and pertaining to a configuration made by a user while utilizing a first entertainment device. The one or more processors are further configured to update the user profile to include the media content preference and communicate via the network at least the media content preference to a controller of a second entertainment device to thereby allow the second entertainment device to store media content according to the media content preference prior to the user beginning to utilize the second entertainment device.

According to yet another exemplary configuration of the invention there is provided a method tailoring user experience across hospitality locations. The method is performed by a user-profile server coupled to a network. The method includes storing a user profile corresponding to a user identifier in a storage device, and the user profile including user-specific information of a user associated with the user identifier. The method further includes receiving via the network a location update associated with the user identifier, the location update representing a current location of the user associated with the user identifier and determining a hospitality location within a predetermined distance of the current location represented by the location update. The method further includes communicating at least one of the user-specific information from the user-profile server to a controller associated with the hospitality location thereby allowing the controller to provide a user-tailored experience to the user according to the at least one of the user-specific information received from the user-profile server.

According to yet another exemplary configuration of the invention there is a user-profile server for providing a user-tailored experience across hospitality locations. The user-profile server includes a network connection for coupling the user-profile server to a network, a storage device, and one or more processors coupled to the storage device and the network connection. By the one or more processors executing software instructions loaded from the storage device, the one or more processors are configured to store a user profile corresponding to a user identifier in the storage device. The user profile includes user-specific information of a user associated with the user identifier. Furthermore, the one or more processors receive via the network a location update associated with the user identifier, the location update representing a current location of the user associated with the user identifier. The one or more processors determine a hospitality location within a predetermined distance of the current location represented by the location update, and communicate at least one of the user-specific information to a controller associated with the hospitality location thereby allowing the controller to provide the user-tailored experience to the user according to the at least one of the user-specific information received from the user-profile server.

According to yet another exemplary configuration of the invention there is a system for providing a user-tailored experience across hospitality locations. The system includes a network connection for coupling a user-profile server to a network, a storage device, a controller associated with the hospitality location, and one or more processors coupled to the storage device and the network connection. By the one or more processors executing software instructions loaded from the storage device, the one or more processors are configured to store a user profile corresponding to a user identifier in the storage device. The user profile includes user-specific information of a user associated with the user identifier. Further, the one or more processors receive via the network a location update associated with the user identifier, the location update representing a current location of the user associated with the user identifier. The one or more processors determine a hospitality location within a predetermined distance of the current location represented by the location update, and communicate at least one of the user-specific information from the user-profile server to a controller associated with the hospitality location thereby the controller provides the user-tailored experience to the user according to the at least one of the user-specific information received from the user-profile server.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof, wherein:

FIG. 3 illustrates an exemplary location and device list, which may be stored as a part of the location and device data at the user-profile server of FIG. 1.

FIG. 4 illustrates an exemplary trip plan stored by the user-profile server of FIG. 1 including details of a user's trip such as hotels, dates, flights numbers, and location identifiers to map to devices on the location and device list of FIG. 3.

FIG. 6 illustrates a message screen on a seat-back entertainment device on a plane informing a user that a movie has been automatically bookmarked, and a welcome screen on an entertainment device at a subsequent hotel allowing the user to continue watching movies that were unfinished at previous locations.

FIG. 12 is an operational flowchart of steps performed by a controller associated with one or more entertainment devices while a user travels according to another exemplary configuration.

FIG. 13 shows an operational flowchart of actions taken by a user-profile server while a user travels to different hospitality locations according to an exemplary configuration.

DETAILED DESCRIPTION OF THE INVENTION

Figure 1:
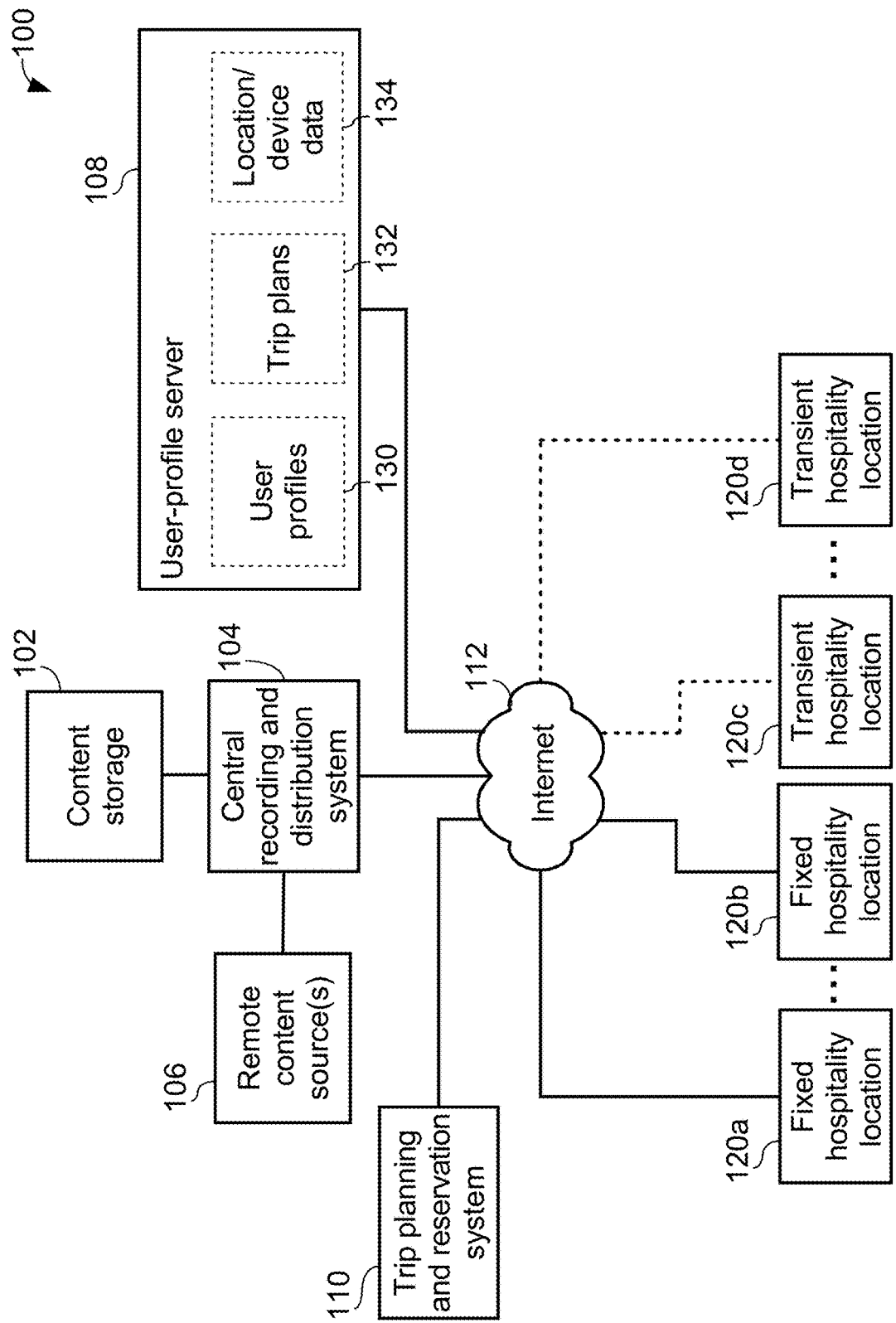
FIG. 1 illustrates a system for providing a user-tailored entertainment experience at different hospitality locations according to a first exemplary configuration.

FIG. 1 illustrates a system 100 for providing a user-tailored entertainment experience at different hospitality locations 120 according to a first exemplary configuration. In this example, the system 100 includes a user-profile server 108, one or more remote content sources 106, content storage 102, a central recording and distribution system 104, a trip planning and reservation system 110, and a plurality of fixed and transient hospitality locations 120. For illustration purposes, two fixed hospitality locations 120*a*, 120*b* connected to the Internet 112 with solid lines, and two transient hospitality locations 120*c*, 120*d* connected to the Internet 112 with dashed lines are shown. The solid lines from the Internet 112 to the fixed hospitality locations 120*a*, 120*b* are meant to represent that the connections are generally fixed and available barring a temporary network problem. Examples of these fixed locations 120*a*, 120*b* may include permanent properties such as hotels, buildings, conference halls, resorts, airport terminals, etc. The dotted lines from the Internet 112 to the transient locations 120*c*, 120*d* are meant to represent that the connections may be temporary or intermittent in nature, or that the location itself is mobile and changes positions over time. Examples of transient locations include all forms of transportation vehicles, portable and mobile electronic devices, equipment that is only in operation for a limited time duration, etc. Local entertainment systems and devices at the various locations 120 are linked to the user-profile server 108 via the Internet 112 or another network in order to provide a persistent entertainment experience to a user during travel. The system 100 may include any number and type of locations 120 with any connection mechanisms to at least one user-profile server 108. For example, any connection techniques to any network 112 may be used including WiFi, LAN, WAN, WLAN, point-to-point link, optical, radio, infrared, etc.

In this configuration, the user-profile server 108 stores and manages user profiles 130, trip plans 132, and location and device data 134 so that, as a user moves between different locations 120, the user's entertainment experience is custom-tailored for the user at each new location 120.

Figure 2:
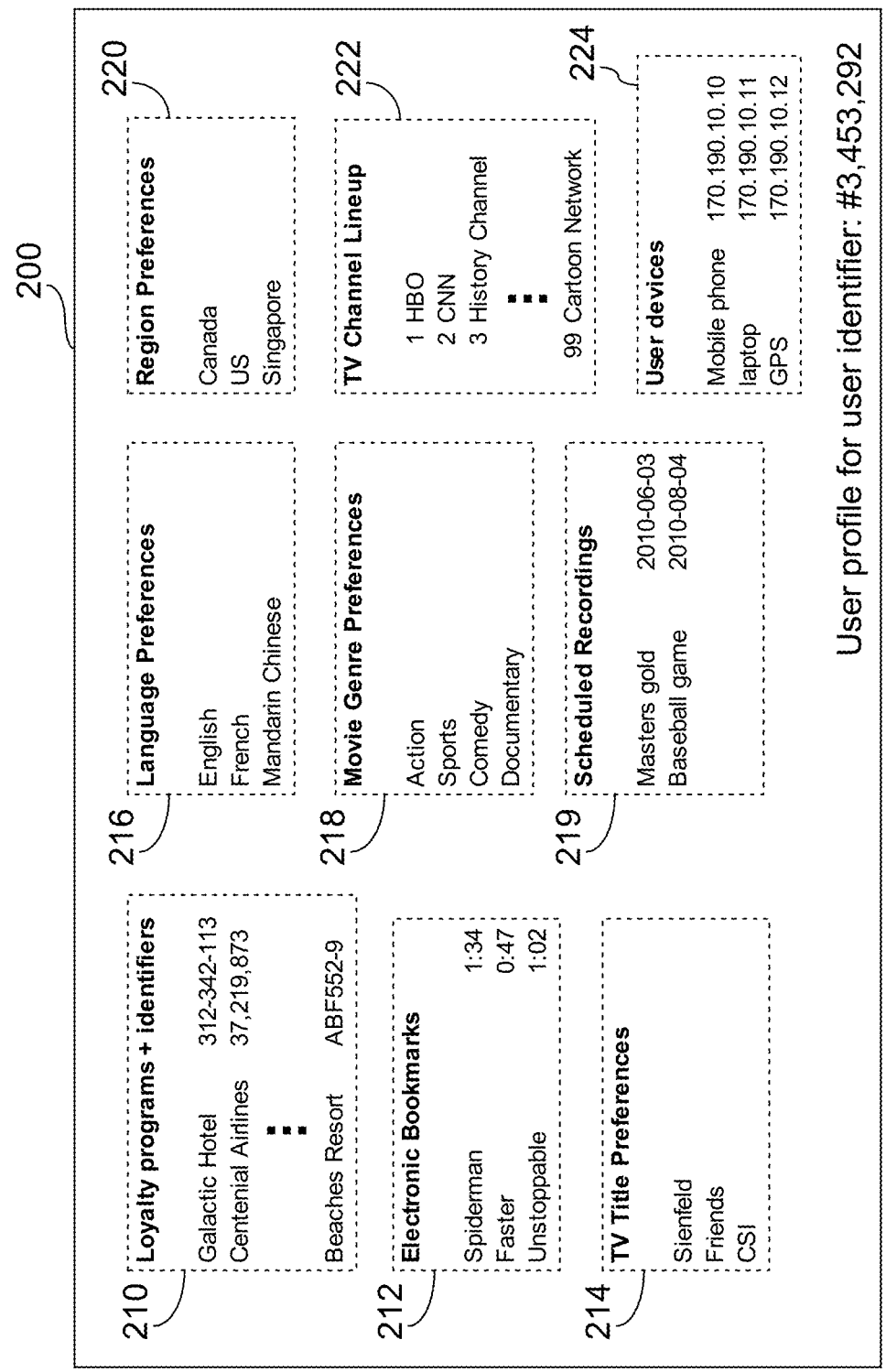
FIG. 2 illustrates an exemplary user profile stored at the user-profile server of FIG. 1.

FIG. 2 illustrates an exemplary user profile 200 stored at the user-profile server 108. The user profile 200 may also be referred to as a user or guest portfolio in other configurations. For description purposes, the user profile 200 corresponding to an exemplary user identifier #3,453,292 is shown in FIG. 2 including user-specific information such as loyalty program and user identification numbers 210, electronic bookmarks 212, TV show title preferences 214, language preferences 216, movie genre preferences 218, scheduled recordings 219, region preferences 220, a user-specific TV channel lineup 222, and user device information 224. The information stored in this exemplary user profile 200 is not meant as limiting. In other configurations, more, less, or different information may also be stored.

FIG. 3 illustrates an exemplary location and device list 300, which may be stored as a part of the location and device data 134 at the user-profile server 108. In this example, the location and device list 300 includes information specific to each location 120 such as a location identifier 302 that allows the user-profile server 108 to correlate controllers on the device list 300 with locations 120 on the various users' trip plans 132. Also included are a general location description 304 and device network addresses 306 for one or more entertainment device controllers at each location 120.

In one configuration, a user utilizes the trip planning and reservation system 110 to setup a trip, and the reservation system 110 notifies the user-profile server 108 and the various fixed and transient hospitality locations 120 that form part of the user's trip of the user's pending arrival. For example, fixed hospitality locations 120*a*, 120*b* may include hotels and resorts, and transient hospitality locations 120*c*, 120*d* may include transportation carriers such as airlines, bus services, and trains. As the user travels through the various hospitality locations 120 on the trip, each location 120 prepares for the user's arrival by downloading the user's profile 200 from the user-profile server 108 and gathering and recording user-desired content as specified on the user's profile 200.

Gathering may include downloading content from online or other content sources 106, and recording may include scheduling a local personal video recorder (PVR) at the location 120 or other recording system 104 to record user-desired content that is available before the guest arrives. Preparing for a user's arrival may also include gathering and recording content that was started at another location 120 but that has not yet been finished by the user as tracked by the electronic bookmarks 212. Content may include movies, music, radio, video games, web sites, RSS feeds, e-books, forums, Internet sites and/or browsing history, and other types of content. Alerts from the user-profile server 108 are also received by the locations 120 (by push/pull polling or interrupt techniques) that correspond to changes in the user profile 200 caused by activities or events that occur before the user arrives.

After arrival and while at any specific location 120, the location 120 may track the user's usage of the location's 120 entertainment system/device(s) and notify the user-profile server 108 of any unfinished actions such as when the user has unfinished movies or schedules future content to be recorded, and any finished actions such as when the user finishes a previously unfinished movie or cancels future content from being recorded. Additionally, each location 120 may automatically adjust the content available on entertainment devices used by the user to match content preferences listed on the user profile 200. In this way, as the user travels, future locations 120 may actively prepare for the user's arrival according to actions and events related to the user at previous locations 120. Content available at each location is automatically customized to match user preferences, and the resulting user-tailored entertainment experience may appear to the user to be persistent and location-independent during travel. Once the user has left a particular location 120, the location 120 may transfer any final information about the user or unfinished location-specific content that the user still wants to use to the user-profile server 108 and delete unneeded user-specific content.

In an exemplary usage scenario of this configuration, assume that a user associated with user identifier #3,453,292 (corresponding to user profile 200 shown in FIG. 2) utilizes the trip planning and reservation system 110 to schedule a vacation. In this example, the reservation system 110 may operate as a Web page accessible to the user through the Internet 112 and may help coordinate reservations with each of the locations 120, and plan and keep track of the user's itinerary. When the reservations at the various locations 120 of the user's trip are confirmed, the reservation system 110 may pass details of the user's vacation to the user-profile server 108.

FIG. 4 illustrates an exemplary trip plan 400 stored by the user-profile server 108 corresponding to user identifier #3,453,292 and includes information such as a sequence 402 that indicates the user's intended order of locations 120, the dates 404 that the user plans to be located at each location, a location description 406 that also identifies any known user-specific details of each particular location 120, and a location identifier 408 that allows the user-profile server 108 to map each location of the trip plan 400 to one or more entertainment device controllers on the location and device list 300. As shown in FIG. 4, the trip plan 400 may include details of the user's vacation such as flight numbers, flight dates, transfer points, hotels, dates of stays, bus tours, ground transportation, etc. In one configuration, any location 120 at which the user plans to be located having one or more guest-facing entertainment devices may be automatically included on the trip plan 400 by either the reservation system 110 or the user-profile server 108.

Figure 5:
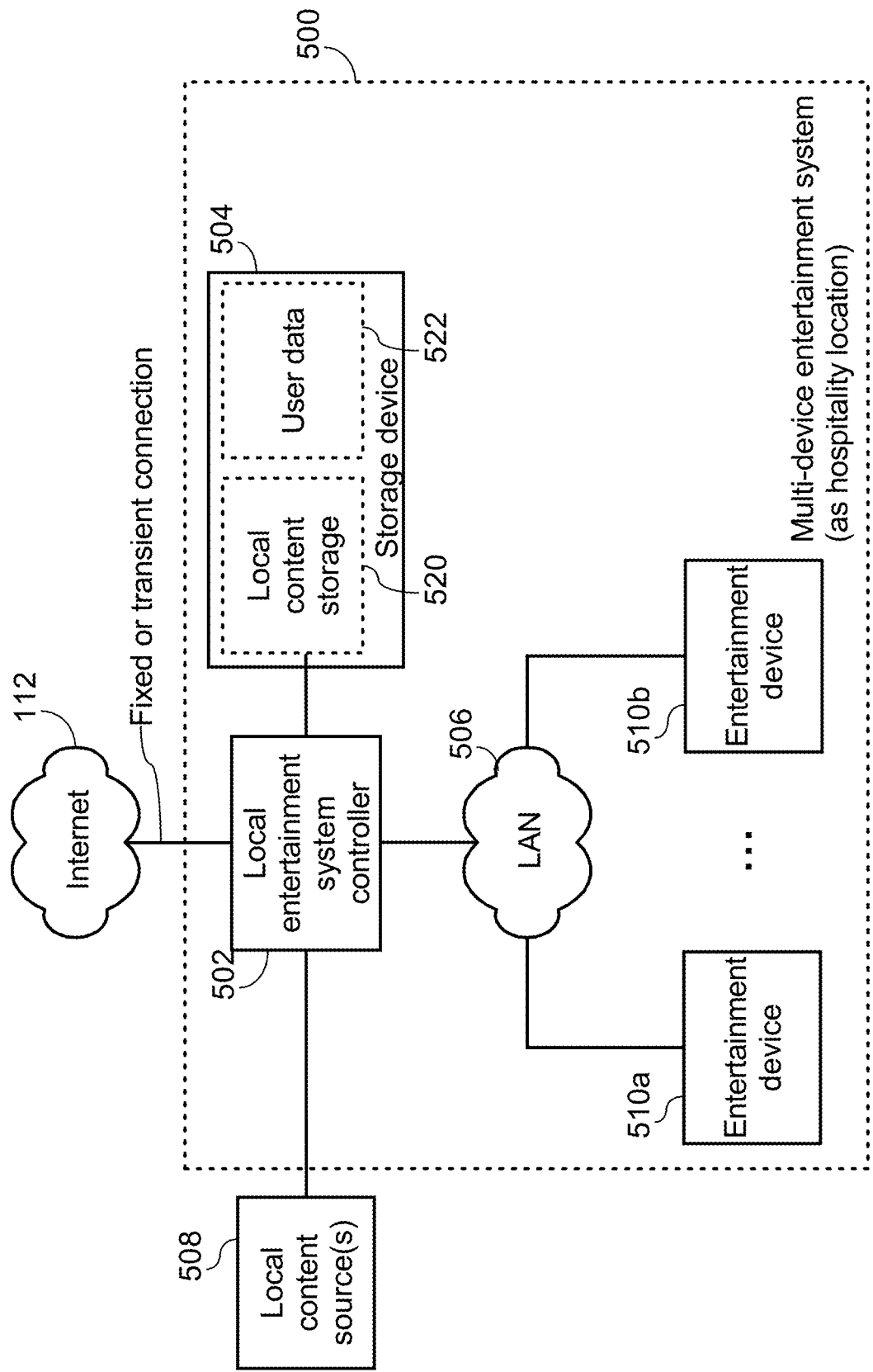
FIG. 5 illustrates an entertainment system having a plurality of entertainment devices at a particular location according to an exemplary configuration.

FIG. 5 illustrates an entertainment system 500 having a plurality of entertainment devices 510 at a particular location 120. As shown, the entertainment system 500 could be installed in either a fixed or transient location. For example, the entertainment system 500 could be installed in a fixed location such as a hotel or resort complex having entertainment devices 510 installed in guest rooms. Alternatively, the entertainment system 500 could be installed in a transient location such as an airplane or bus having entertainment devices 510 installed in seat-back positions for each traveller. It is also possible that components of the system 500 are installed at different locations. For example, the controller 502 may be installed in a central server and may control entertainment devices 510 at a plurality of different hospitality locations 120.

In this configuration, the entertainment system 500 is coupled to the Internet 112 and includes an entertainment system controller 502, one or more local content sources 508, a storage device 504 having stored therein local content storage 520 and user data 522, and a plurality of entertainment devices 510. The entertainment devices 510 may be coupled to the system controller 502 via a local area network 506 or any other connection mechanism.

The fixed or temporary (transient) connection to the Internet 112 allows the entertainment system controller 502 to retrieve user profiles 130 and changes to the user profiles 130 from the user-profile server 108. Additionally, while a user is using the entertainment system 500, the entertainment system controller 502 may also notify the user-profile server 108 of any events or actions that may affect the user's entertainment experience at other locations 120. In this way, unfinished actions may be continued at subsequent locations and the overall experience may appear persistent to the user as they travel.

Continuing the above exemplary usage scenario, after storing the trip plan 400, the user-profile server 108 may communicate information from the user's profile 200 to one or more controllers 502 associated with each location 120 on the user's trip plan 400. In one configuration, because the reservation system 110 has confirmed reservations with the locations 120 on the trip plan, the controller 502 may have already stored a list of users and reservation details within the user data 522. In a hotel environment, for example, this may be stored in the form of a property management system (PMS). In this configuration, the controller 502 at each location may request the user profile 200 from the user-profile server 108 when it is ready to start preparing for the user's arrival. In another configuration, the user-profile server 108 may send the profile to the locations without waiting for a request from the location. This may be beneficial when reservations are not made with the locations 120.

Once the user profile 200 has been communicated to a location's controller 502, the controller 502 may prepare for the user's arrival. Preparing for the user's arrival may include gathering content (e.g., recording, downloading, ordering, etc.) according to the user's content preferences 214, 218, language preferences 216, region preferences 220, scheduled recordings 219, and electronic bookmarks 212. Gathering content may also include pre-ordering content from local content sources 508 specifically for the user such as to provide one or more of the specific TV channels on the user's TV channel lineup 222.

The results of such preparation become apparent when the user arrives at each location 120. For example, when the user begins a scheduled airline flight 120c, a personal seat-back entertainment device 510a for the user on the airplane 120c may be automatically customized by the controller 502 with content that is tailored directly to the user according to the user profile 200. Movies that have electronic bookmarks 212 may be gathered in advance and be ready to be continued automatically from the time point in the movie indicated by the bookmark. Specific TV programs may be gathered for the user by the controller 502, stored in local content storage 520, and available on-demand according to the user's TV title preferences 214 and scheduled recordings 219. Other content available at the user's seat-back entertainment device 510a may be automatically chosen according to the language preferences 216, the movie genre preferences 218, and region preferences 220. The channels on live TV may be ordered and have channel numbers as specified for the guest based on the TV channel lineup 222. Any channels that the airplane 120c does not carry may be omitted, but, to keep the numbering of the channels that are available consistent with the user's preference, the numbering of the available channels may still be done using the numbers specified on the user's TV channel lineup 222. For a different traveller, the controller 502 may customize in an independent manner a second seat-back entertainment device 510b. In this way, the entertainment experience provided by the system 500 may be individually tailored for each traveller.

Various identification numbers for different loyalty programs 210 stored in the user profile 200 may help the user-profile server 108 and/or controller 502 identify and cross reference the user across a large number of separate corporations and locations 120. For example, different airlines may associate a same traveller with different frequent flyer card numbers; similarly, different hotels may associate a same traveller with different preferred guest card numbers. To transparently and automatically identify the traveller across each of these separate systems, the user-profile server 108 may include any number of such loyalty program numbers and identifiers 210 stored in a user profile 200 for each user. When communicating with controller(s) 502 associated with each location 120, the user-profile server 108 may automatically include the corresponding loyalty program number for that location 120. These loyalty program numbers may also be collected by the trip planning and reservation system 110 during the initial reservations by the user and then passed to the user-profile server 108 for storage in the user profile 200. Other information of the user may also be utilized to identify users including name, age, phone numbers, loyalty program numbers, club membership numbers, user numbers, login usernames/passwords, email addresses, etc.

Continuing the above usage scenario, the controller 502 may notify the user-profile server 108, either during the flight or sometime after the flight ends and the user has disembarked, of actions taken by the user while aboard the airline flight 120c. The notification may include an updated user profile 200 or other information relating to usage. Depending on the information in the notification and the locations 120 remaining on the user's trip plan 400, the user-profile server 108 may then pass one or more alerts to other locations 120 on the user's trip plan 400 as required. For example, while aboard the flight 120c, the user may start but not finish a particular feature movie. This could occur if the plane 120c begins the landing decent and, for safety reasons, prevents passengers from using the onboard entertainment system 500 before the user has finished watching the full movie. To allow the user to finish the movie at other locations 120, the entertainment system controller 502 on the plane 120c may pass an electronic bookmark corresponding to the unfinished movie to the user-profile server 108. The electronic bookmark may be added to the electronic bookmarks 212 section of the user profile 200 and include the time point in the movie where the user stopped playing the movie. For example, as shown in FIG. 2, if the user made it to the one hour and thirty-four minute mark of the movie "Spiderman" while on the plane 120c, this information is stored in the electronic bookmarks 212 of the user profile 200.

Assuming that the plane 120c corresponds to the Asia Air flight #8 shown as sequence number 12 on the trip plan 400 of FIG. 4, the user-profile server 108 may automatically determine remaining locations 120 of the user trip as the locations associated with the location identifiers 408 from sequence number 13 to 20 on the trip plan 400. To allow the user to finish the movie "Spiderman" at any these remaining locations 120, the user-profile server 108 may then automatically send an alert to one or more of the remaining locations 120 on the user's trip plan 400 such as a hotel 120a the user has reserved (e.g., the Formosa Hotel, location identifier 1023 in the trip plan 400) so that the unfinished movie will be ready for the user to finish in the user's hotel room. The alert corresponding to the new electronic bookmark for "Spiderman" may be sent by the user-profile server 108 to an entertainment system controller 502 of the hotel 120a before the user has checked-in at the hotel 120a. In order to send the alert, the user-profile server 108 may correlate the location identifier 408 of the Formosa Hotel in FIG. 4 with the corresponding device IP address 306 in FIG. 3. For example, location identifier #1023 shown in FIG. 4 for the Formosa Hotel corresponds to device IP address 202.38.52.1:8329. The user-profile server 108 may thereby automatically pass the alert to this IP address because the user will be next travelling to a location covered by that controller. This could be advantageous in order to allow the controller 502 of the hotel entertainment system 500 to download, record, or order the movie "Spiderman" if it is not already available from either the local content source(s) 508 or local content storage 520 at the hotel 120a. In one configuration, all remaining locations on the user's trip plan 400 are sent the alert. As shown in FIG. 4, because the user's mobile phone is listed last on the trip plan 400, the user's mobile phone will also receive the alerts and will be able to prepare so that the user may finish the movie on their phone, if desired. In another configuration, alerts are sent to all the user devices 224 on the user profile 400 whether or not the user devices 224 are also listed on the trip plan 400.

FIG. 6 illustrates a message screen 600 on a seat-back entertainment device 510 on the plane 120c informing the user that the movie "Spiderman" has been automatically bookmarked. Also shown is a subsequent welcome screen 601 on an entertainment device at the user's hotel 120a allowing the user to continue watching movies that were unfinished at previous locations 120. The welcome screen 601 may be generated by the controller 502 at the hotel 120a according to the electronic bookmarks 212 on the user profile 200 and includes three menu items 602, 604, 606. The user may initiate playing one of the unfinished movies on the entertainment device 510, and the entertainment system controller 502 at the hotel 120a controls the entertainment device 510 to play the selected movie automatically starting from the position in the movie corresponding to the time point indicated by the corresponding electronic bookmark 212.

Similar to while on the airplane 120c, while the user utilizes the entertainment system 500 at the hotel 120a, the system controller 502 at the hotel may notify the user-profile server 108 of actions that may affect other locations. In addition to notifying the user-profile server 108 of unfinished actions, in another configuration, the system controller 502 may notify the user-profile server 108 of finished actions. For example, if the user finishes watching the movie "Spiderman" while at the hotel 120a, the entertainment system controller 502 may notify the user-profile server 108 to delete the "Spiderman" bookmark from the electronic bookmarks 212 stored in the user profile 200. The user-profile server 108 may then determine remaining locations on the trip plan 400 at which the user has not yet been located according to the sequence of the trip plan and the current position of the user. For example, if the user's last known position in the trip plan was sequence number 14, the remaining locations include the location identifiers 408 for sequence numbers 15-20. The user-profile server 108 may then send an alert to one or more of the remaining locations on the user's trip plan 400 to inform them that "Spiderman" is no longer bookmarked. In this way, future locations may delete this movie from their systems or cancel it from being recorded, ordered, etc. The user's last known location may be determined from a previous notification, a GPS or other location-aware device carried by the user such as a cell phone, or from another system such as hotel/airline system messages, for example.

In some configurations, the controller 502 may track usage of the entertainment device 510 by the user and send a notification to the user-profile server 108 when the usage includes an unfinished activity or a finished activity. The controller 502 may also send information pertaining to the unfinished or finished activity in the notification or in response to a query from the user-profile server 108. For example, the controller 502 may send a notification of unfinished activity such as the user configuring particular content to be made available in the future, and send information corresponding to the particular content (e.g., title or content identifier) and a position in the particular content where playback stopped at the entertainment device 510.

In another configuration, the unfinished activity may be the user starting but not finishing playback of particular content at the entertainment device 510. In this case, the controller 502 sends information corresponding to the particular content and a position in the particular content where playback stopped at the entertainment device 510.

The unfinished activity may also involve the user setting a bookmark for playback of particular content starting from a position indicated by the bookmark; the notification including information corresponding to the position in the particular content of the bookmark.

Notifications may also be sent by the controller 502 to the user-profile server 108 when the usage includes the user finishing a previously unfinished activity. For example, when the user finishes playback of particular content that the user started but did not finish at an earlier time, the controller 502 may send information corresponding to the particular content that is now finished to the user-profile server 108.

In another configuration, a notification may be sent to the user-profile server 108 when the user cancels particular content from being made available in the future including information corresponding to the particular content that is no longer required to be made available in the future. Another example involves the user deleting a bookmark for playback of particular content from a position indicated by the bookmark. In this case, information is sent to identify the bookmark that is now deleted.

Additionally, the controller 502 may update the user profile 200 according to the usage and send the updated user profile to the user-profile server 108. Which notifications are sent to the user-profile server 108 may also be user selectable. For example, the user may configure options to automatically send notifications when content is unfinished for certain types of content genres and not for other types of genres according to the user profile 200. In general, notifications for any settings, user preferences, actions, or other events that may affect the user's experience at other locations may be sent to the user-profile server 108. By each location 120 tracking usage and notifying the user-profile server 108 of actions and events that may affect the user at other locations 120, the user-tailored entertainment experience may beneficially include making the experience persistent in that later locations automatically take account of events and actions at previous locations.

As mentioned, an unfinished movie (or other content) while on the flight 120c may be automatically bookmarked and made available at subsequent locations 120. In some situations the unfinished content may already be available at the subsequent location 120 so passing the electronic bookmarks 212 to the subsequent location 120 is sufficient. In other cases, one or more of the unfinished content may be automatically transferred to the subsequent location 120 directly, or to a central recording and distribution system 104 from which it may be downloaded by the subsequent location 120. The user-profile server 108 may track available sources for the content on the user profile 200. Direct transfer may be useful in the event that the content is only available from the local content source(s) 508 at a location where the user began the content. In another configuration, content that was scheduled to be recorded at one location 120, is automatically recorded and made available for playback at subsequent locations 120. Scheduled recordings 219 on the user's profile 200 may either be automatically scheduled to be recorded by the entertainment system controller 502 at each subsequent location 120 if the subsequent locations 120 have access to the desired content from the local content source(s) 508; or to be recorded at the central recording and distribution system 104 and then automatically transferred to subsequent locations 120 for viewing if the content is not available at one or more of the locations on the user's trip plan 400. The transfer of content to the subsequent locations 120 may be performed in real-time when viewed by the user if bandwidth capability is sufficient, or may be transferred in advanced over lower speed links for bandwidth management purposes. Content may also be pre-recorded from other mediums such as satellite or off-air antenna.

Figure 7:
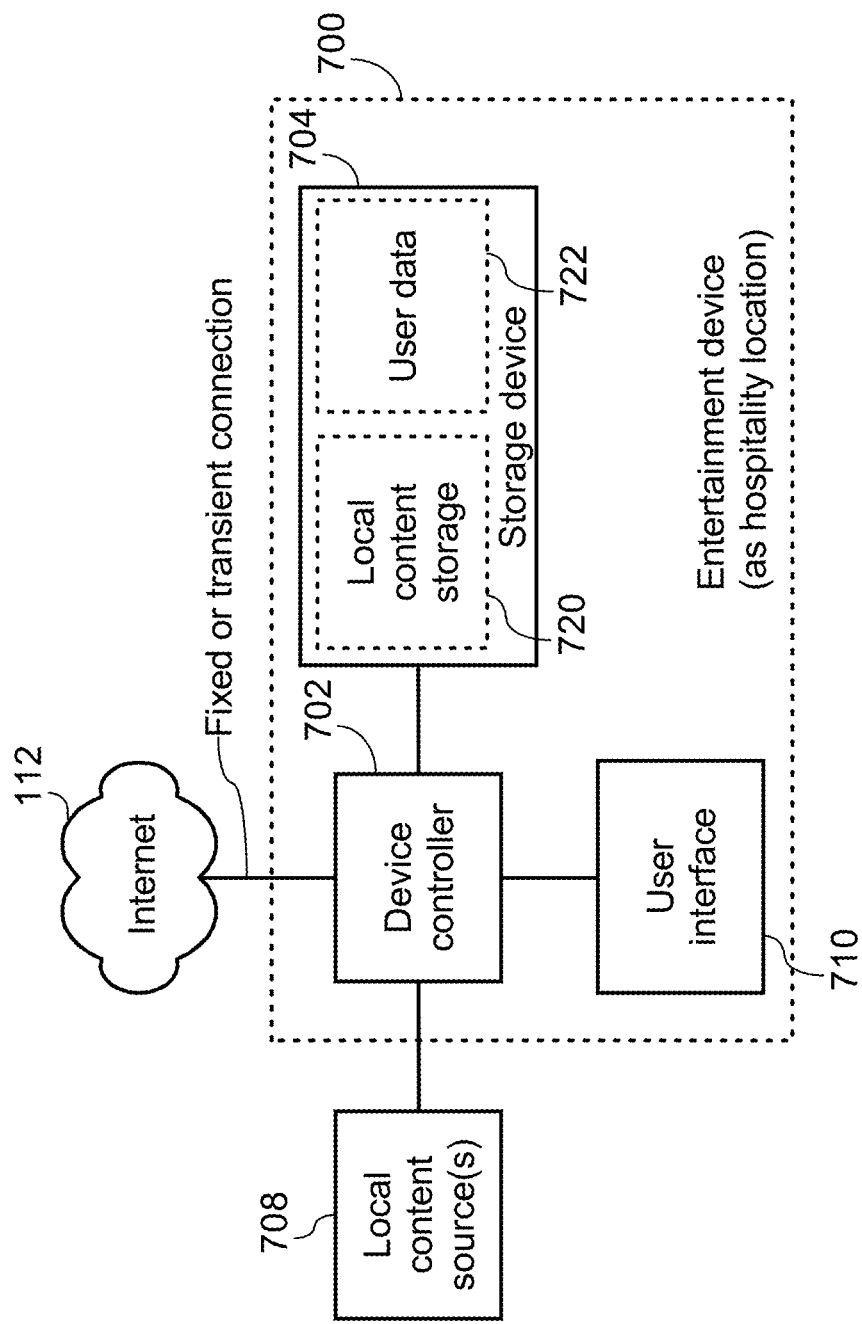
FIG. 7 illustrates a single entertainment device acting as an independent hospitality location according to another configuration.

FIG. 7 illustrates a single entertainment device 700 acting as an independent hospitality location 120 according to another configuration. The entertainment device 700 is coupled to one or more local content sources 708 and includes a device controller 702, a user interface 710, and a storage device 704 for storing local content storage 720 and user data 722. The entertainment device 700 could be a single device that is directly coupled to the Internet (either through a fixed or transient connection) to provide entertainment services to a traveller. Examples include portable electronic devices carried by the traveller such as mobile phones and computers, and also devices such as kiosks installed at airports or hotels that allow various entertainment functions without requiring a local entertainment system 500. A hotel or airplane, for example, may have installed only set-top boxes configured as entertainment devices 700 coupled directly to the Internet 112. This could be useful in a software-as-a-service (SaaS) configuration to minimize on-site hardware required at the hospitality location 120.

In another configuration, the entertainment device 700 may be a mobile phone carried by the user having audiovideo playback capabilities. This configuration may be useful to allow a user to utilize their mobile phone to finish movies (or other content) that was started at a previous location 120, such as on the flight 120c described above. A section on the user profile 200, entitled "user devices" 224, may be included to keep track of the user's personal devices, and the user-profile server 108 may automatically send content, electronic bookmarks, and other settings to one or more of these user devices 224 as additional hospitality locations 120.

A software application may be installed on the user device in order to provide it the functionality of the device controller 702 and other modules 704, 710, 720, 722 shown in FIG. 7, and to allow it to send and receive information to/from the user-profile server 108. In this configuration, a general purpose processor of the entertainment device 700 executes software of the application program in order to perform the functions described herein for the device controller 702. Flash based memory or other storage mediums (volatile or non-volatile) may be utilized to implement the storage device 704 and to store the application program. A touch screen, keyboard or display may be utilized to implement the user interface 710, for example.

Figure 8:
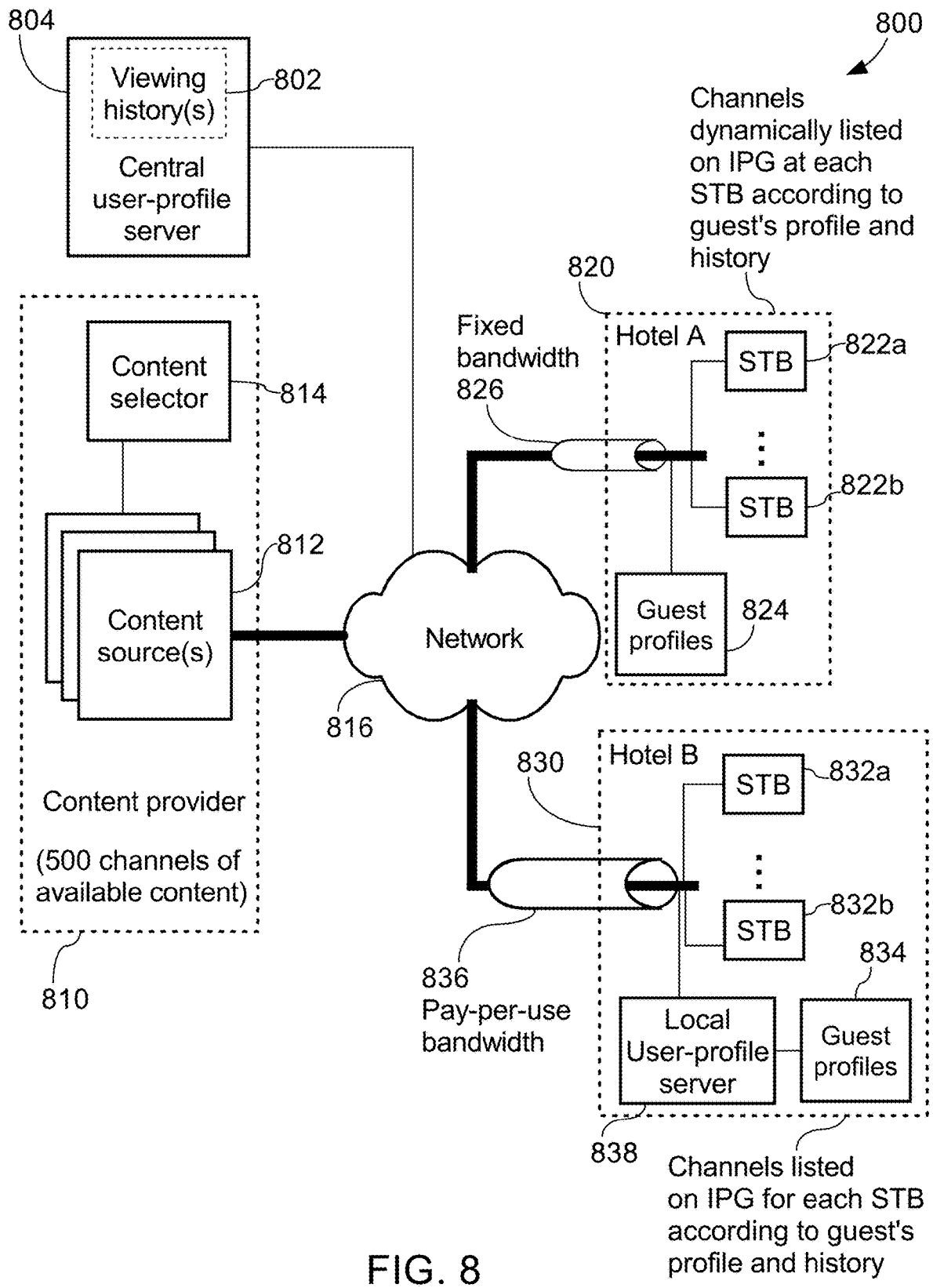
FIG. 8 illustrates a system for providing a user-tailored entertainment experience at different hospitality locations according to a second exemplary configuration.

FIG. 8 illustrates a system 800 for providing a user-tailored entertainment experience at different hospitality locations 820, 830 according to a second exemplary configuration. The system 800 includes a central user-profile server 804, a content provider 810, and a plurality of hotels 820, 830. The central user-profile server 804 stores viewing histories 802 and may also centrally manage the user profiles 824, 834 at the hotels 820, 830. Although not illustrated in FIG. 8, in another configuration, the central user-profile server 804 may also store the user profiles 824, 834. A content selector 814 is configured to retrieve user profiles 824, 834 corresponding to the current guests at each hotel 820, 830, and to automatically adjust what content is made available on the STBs 822, 832 at each hotel 820, 830 according to information stored in the user profiles 820, 830 retrieved for the current guests in each hotel 820, 830. As each hotel 820, 830 will usually have different current guests with different user profiles, the content selector 814 may adjust the content available on the STBs 822 at the first hotel 820 to be different than the content available on the STBs 832 at the second hotel 830.

The content provider 810 includes one or more content sources 812 such as satellite receivers, magnetic and optically stored content players, cable provider connections, live video feeds, radio receivers, etc. The first hotel 820 includes a plurality of set-top boxes (STBs) 822 and guest profiles 824, which may be stored in a property management system (PMS) utilized by the hotel 820. For example, the STBs 822 are shown including first STB 822a and second STB 822b. The guest profiles 824 include information for the guests currently staying at the first hotel 820. On-site entertainment system hardware at the first hotel 820 need only include STBs 822, while the selection of the content and other control aspects of the first hotel's 820 entertainment system are performed as SaaS provided from the central user-profile server 804 and content provider 810 via the network 816.

The second hotel 830 similarly includes a plurality of STBs 832 and guest profiles 834, and further includes a local user-profile server 838 that may locally manage the user profiles 834 and provide other control aspects. Again, for example, the STBs 832 are shown including first STB 832a and second STB 832b. Additionally, the local user profile server 838 offers redundancy in the event the central user-profile server 804 goes down or is unavailable.

In an exemplary configuration, the content selector 814 operates according to instructions received from the central user-profile server 804, the local user-profile server 838, and the STBs 822, 832 in order to dynamically select user-targeted content and forward the selected user-targeted content to the network 816. In this configuration, the content provider 810 dynamically distributes content selected according to guest related customization criteria to the STBs 822, 832 at multiple hotels 820, 830. Content available to guests in each hotel 820, 830 at any given time is dynamically selected according to guest related customization criteria such as current channel requests by the guests, viewing histories 802, and guest profiles 824, 834. The network 816 shown in FIG. 8 may be the Internet or another type of network. In order to save on bandwidth costs, viewing histories 802 and guest profiles 824 are utilized to limit the number of channels that need to be concurrently made available at each hotel 820, 830. This not only reduces the bandwidth utilization 826, 836 required at each hotel 820, 830 and lowers the operating cost of the system 800 but also enhances the guest experience because the available content is likely to be found interesting to current guests staying at each hotel 820, 830.

Figure 9:
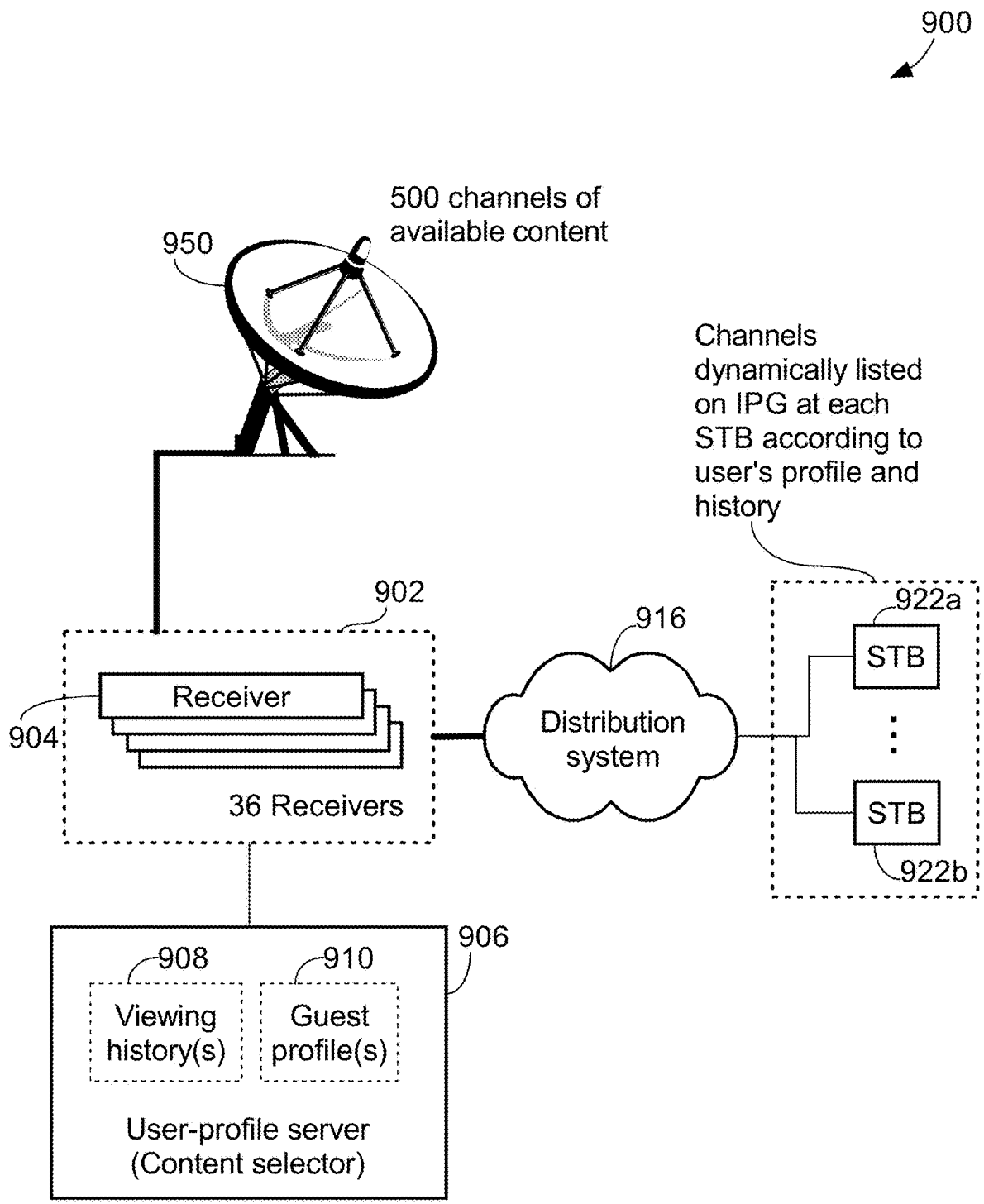
FIG. 9 illustrates a system for providing a user-tailored entertainment experience at different entertainment devices by selecting which satellite channels to receive and send to various set-top boxes according to a third exemplary configuration.

FIG. 9 illustrates a system 900 for providing a user-tailored entertainment experience at different entertainment devices by selecting which satellite channels to receive and send to various STBs 922 according to a third exemplary configuration. For example, the different entertainment devices are shown including STB 922a and second STB 922b. The system 900 of FIG. 9 may be installed a single hospitality location 120 or may include STBs 922 (or other entertainment devices) at a plurality of different properties.

The system 900 includes a content source 902 including a plurality of satellite receivers 904 coupled to a satellite dish 950. A user-profile server 906 stores and manages viewing histories 908 and guest profiles 910, and acts as a content selector to control the content provider 902 to provide user-tailored content to each of the STBs 922. In this configuration, viewing histories 908 and guest profiles 910 are used to select which satellite channels to decode using the satellite receivers 904 and make available to the various STBs 922. The content selector 906 is configured to adjust the content available on each of the STBs 922 at the hospitality location by dynamically selecting, according to at least the information stored in the guest profiles 910, which channels to decode with a predetermined number of satellite receivers 904, the decoded channels being distributed to the STBs 922 at the hospitality location. By dynamically controlling the channels that are decoded, the required number of satellite receivers 904 is reduced while ensuring that content that is likely to be found interesting to current guests remains available at the STBs 922.

Figure 10:
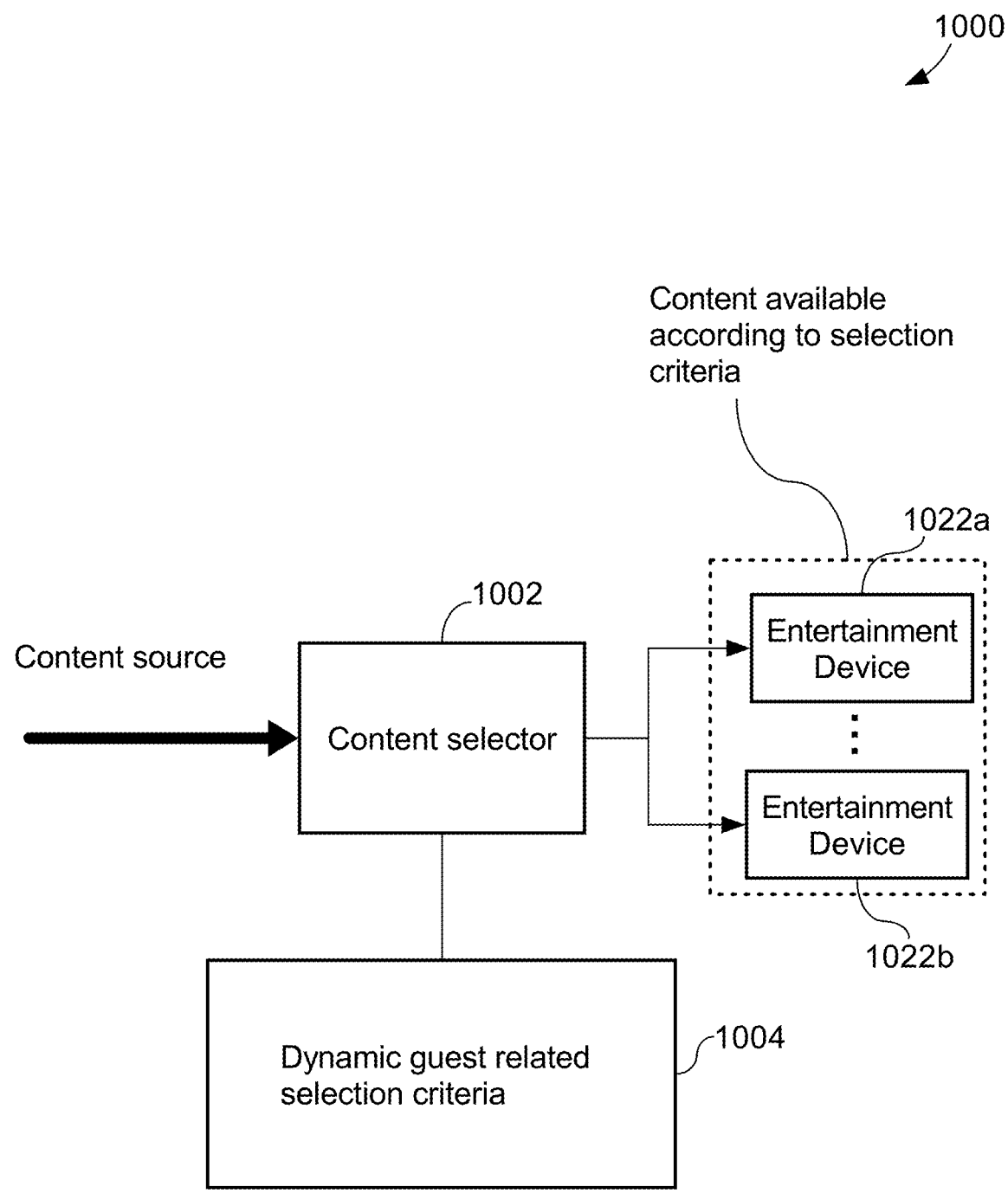
FIG. 10 shows a generalized block diagram of an entertainment system dynamically selecting content according to guest related customization criteria in another configuration.

FIG. 10 shows a generalized block diagram of an entertainment system 1000 having a content selector 1002 for dynamically selecting content according to guest related customization criteria 1004 in another configuration. As shown, only content that is actually going to be useful or interesting to the guests is made available at the entertainment devices 1022. For example, the different entertainment devices 1022 are shown including first entertainment device 1022a and second entertainment device 1022b. The selections are made dynamically and may change according to which guests are currently utilizing the entertainment system 1000, and according to what content those guests are actually trying play on the entertainment devices 1022. In addition to real-time content requests by the guests, the guest related customization criteria 1004 may be determined using any information stored in the user profile 200.

Concerning the guest related selection criteria for content selection in the systems 800, 900, 1000 shown respectively in FIG. 8, FIG. 9, FIG. 10, a first configuration involves current channel requests by guests. Taking FIG. 8 as an example, an interactive program guide (IPG) on a first STB 822a in a guest room at the first hotel 820 may list many channels and other content as being available at the hotel 820. The IPG may have the channels, order of the channels, favourites, bookmarks, genres, etc. all customized for the user individually according to the user's profile 200.

Alternatively or in addition, at least a same set of the content listed on the IPG may be available hotel-wide (i.e., on all STBs 822 in the first hotel 820), and this set of content may be dynamically determined by the content selector 812 (or another controller) according to the guest profiles 824 of the users currently staying at the hotel 820. For example, when a first group being business guests are staying in the first hotel 820, all STBs 822 in the first hotel 820 may have a same set of news and financial channels listed as core channels one to ten, for example. At a later time, when a second group being tourists are staying in the first hotel 820, all STBs 822 may have a same set of Hollywood and travel channels listed as core channels one to ten. Making at least a same set of content available on all STBs 822 while dynamically adjusting what content is included in the set is particularly advantageous in a hotel having an analog content distribution system such as 1-way RF coax cables; one advantage of this configuration is to maximize the chance that current guests of the hotel 820 will be able to find at least some content of interest.

The content selector may also make available on a first STB 822a a first set of content based upon information in a first one of the user profiles 824 and make available on a second STB 822b a second, different set of content based upon information in a second one of the user profiles 824. This configuration is particularly advantageous in a hotel having a digital content distribution system such as an Ethernet or other IP based computer network; one advantage of this configuration is to customize each guest's available content according to the guest's user profile.

In one configuration, only channels that are actually being watched by at least one guest at the first hotel 820 need be streamed to the first hotel 820. This dynamic content selection minimizes the amount of bandwidth 826 between the content provider 810 and the first hotel 820. This is beneficial when owners of the hotel 820 need to pay for a fixed bandwidth connection 826 to the network 816 because a lower fixed bandwidth 826 may be purchased while still maintaining a high number of possible channels on an IPG at each STB 822. The reason is not all channels will be simultaneously viewed by guests. A similar cost reduction is enjoyed concerning the pay-per-use variable bandwidth 836 of the second hotel 830 because owners of the second hotel 830 need only pay for the bandwidth that is actually utilized by guests even though there may be hundreds or thousands of channels shown as available at each STB 832. Concerning FIG. 9, the dynamic selection of content to be streamed to STBs 922 similarly minimizes the number of required satellite receivers and other content distribution hardware (not shown).

Another configuration for selecting content involves the viewing histories 802, 908. Viewing histories 802, 908 for each channel (or other content) at each hotel 820, 830 or system 900 are logged as they are watched by guests. The logs include the date and time and may be done on an aggregate basis for each hospitality property 820, 830. According to the viewing history information, the content selector 814 of FIG. 8 (or the user-profile server 906 of FIG. 9) knows which channels are popular at which hotels 820, 830 and may automatically make available the popular channels for each hotel 820, 830 at the appropriate times. Also according to these logs, each hotel 820, 830 will be able to determine how many channels are typically being watched at any given time and set the bandwidth 826, 836 or purchase an additional number of satellite receivers 904.

In FIG. 8, bandwidth upgrading may be done automatically using a variable bandwidth connection 836 when the viewing histories show that many guests were unable to watch a desired program due to the available bandwidth being saturated. Likewise, if the viewing histories indicate that guests were unable to watch desired content due to all the satellite receivers 904 in FIG. 9 being utilized, an alert may be automatically sent to hotel staff to recommend the hotel to purchase and install more satellite receivers. This may also be done automatically by one of the components of the system 800, 900 such as the content selector 814 or user-profile server 906. Some content genres may be more popular at different times of the day according to the viewing histories and therefore the content selector 814 may select these channels as available at the times when they are most likely to be watched.

In another configuration, personalized user profiles 824, 834 such as illustrated in FIG. 2 are utilized to control content selection. Taking FIG. 8 as an example, a profile on each individual guest may be kept by the hotels 820, 830, the local user-profile server 838, or the central user-profile server 804 including specifics about each guest such as preferred languages and preferred content types. The content selector 814 may automatically select user-targeted content that would be appropriate for the particular guests currently staying in the hotel 820, 830 according to the data in the user profiles 824, 834. The user-targeted content may be selected by matching an aspect of content provided by the content source(s) 812 with at least one preference specified in the user profiles 824, 834, for example, preferences 214, 216, 218, 220 in FIG. 2. Different aspects such as content language, genre, title, and region may be employed by the content selector 812 when determining the user-targeted content for each hotel 820, 830. In this way, content made available at the first hotel 820 will be targeted to guests currently staying at the first hotel 820, and content made available at the second hotel 830 will be targeted to guests currently staying at the second hotel 830. As the current guests of each hotel 820, 830 change, the user-targeted content may also change to appeal to the new guests.

When the user profiles 824, 834 are kept by the individual hotels 820, 830 such as illustrated in FIG. 8, guests may indicate their preferences during a reservation process and this information could be stored in a guest database at the hotel or hotel chain etc. such as a property management system (PMS). In another configuration, the user profiles 824, 834 may be kept by the central content provider 810 or central user-profile server 804 as a part of the viewing history 802 for each guest. If a certain guest has watched content in French but never in Chinese according to the viewing history, the central user-profile server 804 may store this information as a language preference 216 in a central guest profile 200 and the content selector 814 will automatically select additional French content while this guest is staying at the hotel.

According to the viewing histories, some channels may be very popular at a particular hotel 820, 830 and therefore the content selector 812 may make these core channels always available. For example, at a hotel having an incoming bandwidth connection (or # of satellite receivers) capable of supporting thirty-six concurrently viewed channels, the content selector 814 may always list a certain number of core channels on the IPG and reserve the bandwidth (or satellite receivers) to ensure these channels may be watched at any time.

When using a networked distribution such as shown in FIG. 8, even though the bandwidth for the core channels is being reserved, the actual data stream does not need to be sent unless a guest actually requests to watch that channel on their STB 820, 830. In this way, unnecessary bandwidth costs are reduced in a hotel that pays on a per-byte rate. Other channels on the IPG may be dynamic according to the guest related selection criteria on a per-guest basis or a hotel-wide basis. In one example, the first twenty channels may be fixed and always available at each STB 822 in the first hotel 820, and the remaining sixteen channels may be dynamically changed according to the guest related criteria on either a per-guest basis, hotel-wide basis, or system-wide basis. In this way, popular core channels are always available and the system 800 is still user-tailored for the current guests staying at the hotel 820. As mentioned, the core channels may also be adjusted according to guest profiles 824 and viewing histories 802 over time.

Another configuration involves removing content distribution servers and other equipment from the hospitality locations such as illustrated at hotel 820 and using a central content distribution center (e.g., content provider 810 and central user-profile server 804) to provide content over a network 816 such as the Internet. In order to reduce the hardware and amount of bandwidth required at the central content provider 810 and at the individual hotel 820, dynamic channel selection is performed by the content selector 814 to choose in real-time which channels are required to be sent to the hotel 820 according the guest related selection criteria described above. In this way, the content delivery is truly a software-as-a-service (SaaS) solution. FIG. 8 shows an example of one configuration. FIG. 9 also illustrates such a configuration when the distribution system 916 is the Internet 112, with a plurality of the STBs 922 located at each hospitality location 120. Multicast packets may be used to ensure that, even if many STBs 822, 832, 922 in a same hotel 820, 830 are watching a program, only one channel's worth of bandwidth will be utilized at the hotel's connection 826, 836 to the network 816, 916. The same process may also be used at the content provider 810 to minimize required source bandwidth.

Another aspect of the invention involves creating a personalized experience across different hospitality locations 120 for the end user based on guest preferences, choices, and behavior. Configurations, histories and usage patterns, and even billing information may be passed from the individual properties 120 to a central user-profile server 108. This can be done automatically at checkout of the user, at predetermined intervals, or when "saved" by the user. The personalized experience may be marketed to users as a loyalty program, and to give guests full privacy, the option to participate in or opt-out of the loyalty program may be provided at any time. This may be done via a checkbox on an electronic form at reservation, for example.

When the user checks-in to any participating hospitality location 120, a controller associated with the hospitality location 120 queries the user-profile server 108 to retrieve information related to the user and thereafter tailors the user's experience at entertainment devices at the hospitality location 120 according said information. As shown in the various exemplary configurations of FIGS. 1, 5, and 7-10, the controller associated with the hospitality location 120 may be implemented in many ways, including the user-profile server 108 of FIG. 1, the entertainment system control 502 of FIG. 5, the device controller 702 of FIG. 7, the central user-profile server 804 of FIG. 8, the content provider 810 of FIG. 8, the local user-profile server 838 of FIG. 8, the STBs 822, 832, 922, 1022 of FIG. 8-10, the user-profile server 906 of FIG. 9, and/or the dynamic guest related selection criteria module 1004 of FIG. 10.

Information stored in the personalized user profile 200 for each guest or traveller may also be varied and expansive in different configurations. Different information may be stored for different users. Examples of other information that may be stored in different configurations include one or more of the following:

- Configurations: preferred room type, UI backgrounds, menu music, UI skin selection (e.g., simplified skin for visually impaired), volume and contrast settings, favorite channels and shows, web site bookmarks, Internet setup such as IP addresses of email/DNS servers, room control preferences, wake up calls and other alarms, room service orders (favorite breakfast etc.), standing instructions such as do not disturb or always make up room, etc.
- Histories and usage patterns: content that has been purchased such as VOD or other pay-per-use content and genres, channels that have been played and their genres, shows that have been played, internet usage such as average and peak bandwidth requirements and what bandwidth packages have been purchased, room service orders, car rentals, gold bookings, spa bookings, music, radio stations/categories, movie genres etc.
- Free to guest (FTG) usage
- Search engine queries
- Ads that have been clicked
- Language preferences
- Identification information such as MAC address of the computer, GSM SIM card number, other electronic ID numbers
- Content filtering settings/parental controls
- Billing information: name and contact details for guest, and credit card information When the guest makes a reservation at a hospitality location 120 such as a hotel, the reservation system 110 may first receive basic details from the user such as name/id, password, and requested dates. The reservation system 110 then checks the user-profile server 108 to see if this guest has any standard requests such as room type (non-smoking, double bed, top floor, view facing, east facing, etc.). These details are suggested as the defaults for subsequent steps in the reservation process.

Upon check-in, the front desk staff may also check the information stored at the central server to make sure the standing instructions are followed and to confirm any details of the instructions with the guest. The electronic media and internet settings in the room are also configured according to the guest's information on the central server.

The in-room STB and hotel media system will be automatically and dynamically configured according to the particular guest. For example, the media system may retrieve the guest's first name, last name, address, guest ID (could be tracked by hotel PMS) from PMS. When entering the room, the guest will find the electronic media devices 510 preconfigured and ready to use according to how the guest had either saved or last configured it. The television may be automatically turned on and playing the favorite show (if possible), or set to the favorite channel at the proper volume level. As previously mentioned, the hotel hardware and/or content sources may be dynamically configured to receive this channel when the guest is in the hotel. Dynamic TV channel line-up and top 1-5 channel lists for the preferred categories are displayed on the menus. The menus and other UI configuration may be dynamically reorganized to meet the guest's preferences.

Video-on-demand (VOD) movies or other pay-per-use content that the guest had already viewed will still be playable if unfinished and the license has not yet expired, or can be filtered out of the available lists to avoid a second payment. Electronic bookmarks 212 allow the user to resume playback of content that was not finished at other locations starting from the bookmarked position in the content. A list of content already purchased can be provided in a separate menu to allow the guest to re-buy the same content again if so desired. If the hotel has an electronic room service system, spa booking system, golf booking system, or other services that can be requested through the media system then the system will be ready to suggest the same or similar orders to what the guest had done at stays at other hotels.

When beginning to use the Internet, the hotel's entertainment system 500 may capture the MAC address of a laptop or other device (wired and wireless) carried by the user and auto detect when the user is logging into the high speed internet access (HSIA) service. Full auto detection means the guest does not have to fill in any information for login. Once logged in, the system may display the average usage or peak usage from the last time the user was online and suggest upgrading to a faster speed connection if this hotel offers tiered bandwidth and if the guest's previous usage exceeded a predetermined level.

Any of the above configurations may be limited to occur only within hospitality properties of a certain chain, occur within any hospitality property regardless of the ownership or association, or any combination thereof.

To accommodate privacy laws in particular countries, no personal information need to be stored in the user profile 200. Recognition of the user could be done according to non-personal information such as an anonymous membership number, or electronically through MAC address of their laptop or GSM SIM card number on a mobile phone, or via a 1-way hash of any type of identification or combination of identification information.

Also, for privacy purposes, the guest may be given the option to withdraw from such tracking either permanently or on a per usage basis. The guest may also change or delete their stored preferences at the central server at any time. A Web based interface may be provided to users to allow them to view and configure their user profile 200 on the user-profile server 108. Furthermore, the guest may enable and disable tracking of any subsection of tracking criteria. For example, the guest may enable TV and Movie genre tracking, but opt out of 'adult' purchase tracking altogether. A user interface may be presented to the user allowing them to enable/disable tracking settings for each of the possible tracking criteria.

Taking hotels as one example, the personalized guest experience in this configuration allows the following benefits:

- High speed Internet Access (HSIA) fast-login
- Dynamic TV and Video-on-demand (VOD) Lineups
- Group communication within a hotel or span across multiple hotels
- "Neilson" like reports to hotels for their assessment, stats/reports and IPTV rankings (hotels can use this to determine what content is most desired by guests and then enhance guest experience by providing this content.)
- Automatic user-based customizations at new locations (e.g., less work by hotel staff in making new guests comfortable)

Persistent, personalized, and location independent entertainment experience at different entertainment devices Person video recorder (PVR) functions under user control that are location independent Consistent channel line-ups 222 (or content line-ups) for each user at multiple locations during travel (e.g., HBO is always channel #1 for the user associated with the user profile 200 of FIG. 2)

In another configuration, the user-profile server 108 takes into account information external to hospitality properties 120 such as what movies the user has watched at home or in theatres, for example. Also, the system 100 may allow the user to update the information settings at the user-profile server 108 without having to be at a hospitality property 120. For example, to get things ready for when they do arrive at a hotel such as utilizing a Web server or other method to configure their personal settings in the user profile 200.

Figure 11:
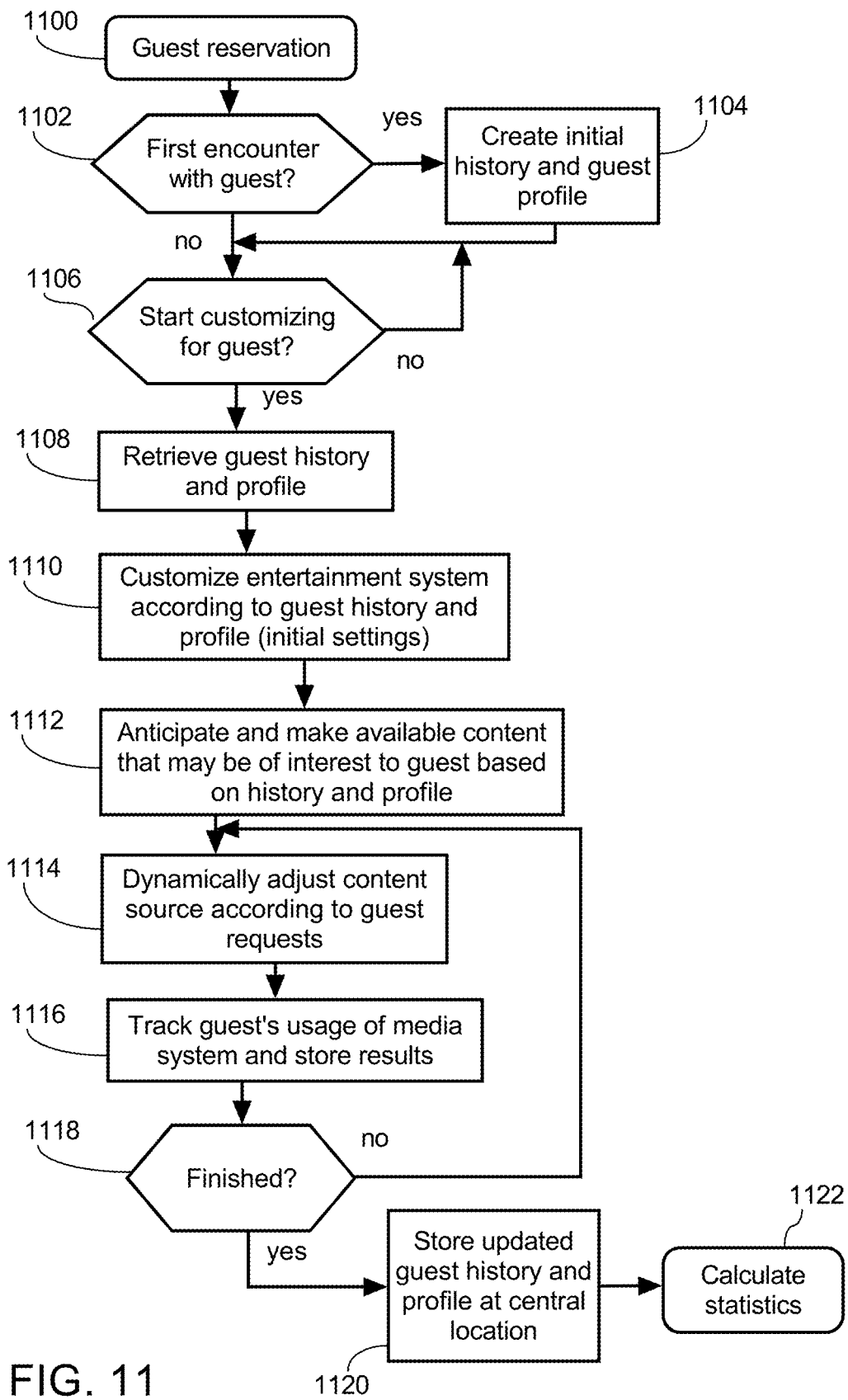
FIG. 11 is an operational flowchart of steps performed by a controller associated with one or more entertainment devices according to an exemplary configuration.

FIG. 11 is an operational flowchart of steps performed by a controller 502 associated with one or more entertainment devices 510, 700, 822, 832, 922, 1022 at a hospitality location 120 according to an exemplary configuration. The steps of FIG. 11 may be performed by the controller 502 being located at the hospitality location 120 such as the entertainment system controller 502 of FIG. 5. The following description will utilize this configuration for illustration purposes. However, it should be noted that the functions of the controller 502 may also be integrated with other devices such as the device controller 702 of FIG. 7, an individual STB 922 of FIG. 9, or another entertainment device 1022 of FIG. 10. In other configurations, the controller 502 may be located at a central or remote location such as when integrated with the functionality of the central user-profile server 804 or the content provider 810 of FIG. 8. The steps of the flowchart in FIG. 11 are not restricted to the exact order shown, and, in other configurations, shown steps may be omitted or other intermediate steps added. The entertainment device controller 502 shown in FIG. 5 may be implemented using application specific hardware techniques, or may be implemented in other configurations as a software program that is executed by one or more general or specific purpose processors. The processor may operate pursuant to instructions of the software program to perform the functions described for the controller 502. In this configuration, the entertainment device controller 502 performs the following operations:

Step 1100: A user reservation is made. The reservation may be done online via a Web server reservation system 110 centrally or at the hospitality location 120, for example.

Step 1102: This step may involve checking through a database storing information such as user profiles 200 including customization preferences, languages, histories etc. to determine if this information already exists for this particular user. If there is information stored at the user-profile server 108, this information may be used to facilitate the reservation process because standard requests by the user stored in the database may simply be confirmed with the user during the reservation process.

Step 1104: If there is no information stored yet, a user profile 200 may be created using the information obtained during the reservation process. For example, when booking a hotel reservation, a user profile 200 may be stored including information such as desired room size, smoking preferences, language preferences, region preferences, entertainment content preferences, etc.

Step 1106: Either in advance or when the user begins utilizing an entertainment device 510, 700, 822, 832, 922, 1022 at the hospitality property, the entertainment device is automatically customized for the user. This could occur in advance such as when a user confirms a reservation or begins a trip to allow the location to prepare for the user's arrival by gathering user-desired content according to the user profile 200. Alternatively, this may occur upon check-in at a particular hospitality location 120 such as a hotel property or airline flight, or when a user signs-on or otherwise authenticates at an entertainment device 700 such as a mobile phone or kiosk in an airport terminal, for example. Control proceeds to step 1108 when customization is to begin.

Step 1108: The entertainment device controller 502 associated with the hospitality property 120 retrieves the user profile 200 for the guest. The user profile 200 may be stored in a central location such as a central user profile server 108 accessible from any number of different hospitality locations 120. In this way, the same configuration preferences and settings desired by the guest can be automatically utilized at each hospitality location 120.

Step 1110: At this step, the entertainment device(s) 510, 700, 822, 832, 922, 1022 utilized by the guest are customized by the entertainment device controller 502 according to the guest profile. Any number of customizations may be performed including all the above described aspects such as configuring a TV and/or STB to display favourite shows, channels, background music, etc. In a hotel, room temperature, fan settings, light settings, ambience, screen savers with user configured images, etc. may all be pre-set so that when the user enters the room everything is just as they want it to be and no extra configuration is required.

Step 1112: Content that may be of interest to the user may be based on viewing histories and/or preferences in the user profile 200. In a multi-user entertainment system 500 such as might be installed in a hotel, depending on which guests are currently staying the hotel, the system controller 502 may automatically choose what content to provide on a hotel-wide basis. This could be done by automatically reconfiguring satellite receivers to receive, decode, and broadcast throughout the hotel channels that are in the correct languages as required by the current guests. As different guests check-in and out, the default channel line-up may vary. A similar process may be performed for Internet distribution as shown in FIG. 8 where only a certain number of channel streams may be downloaded simultaneously limited by a fixed bandwidth connection 826. In this case, the system controller 502 may reserve bandwidth for channels according to which guests are currently in the hotel. For example, if a French speaking guest is in the hotel, the media system may automatically reserve enough Internet bandwidth 826 to stream one or more French content channels into the hotel. This way, no matter what content is currently being viewed by other guests, the French speaking guest will always be able to start watching French content. When the French speaking guest leaves the hotel, the media system may no longer reserve this bandwidth for French content channels if there are no other French speaking guests staying in the hotel. In one configuration, an IPG may only display content channels that are currently provided within the entertainment system 800 (i.e. broadcast within the hotel either by streaming or decoding). These channels listed on the IPG may change according to the guest selection criteria. In another configuration, the IPG may list any content that could be made available within the entertainment system 500. Upon selection of desired content by a guest, the system controller 502 may automatically order or stream the desired content from one or more of the local content sources 508, a remote content such as the central recording and distribution system 104 via the Internet 112, or the local content storage 520, for example.

Step 1114: Content may be dynamically adjusted according to user requests. Especially for IP based networks such as the Internet 112 or other hospitality system networks 506, 916, it may be advantageous to not stream content across the network 112, 506, 916 unless it is actually being utilized by users. One reason is to reduce bandwidth requirements and costs. When a particular user requests a particular program on the IPG, the entertainment system controller 502 may automatically begin to stream the particular program. As mentioned in step 412, the programs listed on the IPG may be dynamically determined location-wide according to which guests are currently at the hospitality location 120, and/or may be configured on an individual basis where some users see different IPG line-ups than others according to their personal viewing histories, settings, and preferences on their user profile 200.

Step 1116: As the guest utilizes the entertainment system or device, usage is tracked and stored to better understand and predict this particular user's habits, configuration settings, usage patterns, requests, favourites, and other preferences. The user profile 200 may be automatically updated by the user-profile server 108 to include new preferences or delete old preferences according to the usage.

Step 1118: At this step a determination is made as to whether the usage by the guest is finished so that automatic customization for the user may be stopped. Usage may finish when the guest stops using the entertainment device, however, because the guest may resume using the entertainment device it may be desirable in some configurations to tie this step to a more permanent event. Examples include a guest checking out of a hotel, disembarking an airline flight or scheduled bus service, arriving a subsequent location on the trip 400, moving a predetermined distance from the entertainment device as detected by GPS, etc. When it is determined that the usage is finished, control proceeds to step 1120.

Step 1120: Any unreported changes to the user profile 200 may be sent to the user-profile server 108 for central storage. The information tracked and stored in step 1116 may be stored at a central location to allow other entertainment systems 500 and entertainment devices 700 to be automatically customized for the user.

Step 1122: Statistics may be provided at any time to hospitality location 120 administrators, owners, partners, etc. concerning the information that was tracked in step 1116. These statistics may also be utilized by the entertainment system controller 502 to automatically order new content channels from the local content sources 508 or to upgrade bandwidth 826, 836 to meet anticipated demand. For example, from the statistics, it may become apparent that certain channels or content are never watched and the hospitality location need not pay subscription fees for these unpopular channels and content. In another example, the statistics may show that during certain times the bandwidth capacity of a connection 826 to an external content provider 810 (such as via an Internet service provider ISP) is saturated and at other times it is underused. The system may therefore automatically adjust the bandwidth connection to support demand.

FIG. 12 is an operational flowchart 1200 of steps performed by a controller 502 associated with one or more entertainment devices 510, 700, 822, 832, 922, 1022 at a hospitality location 120 while a user travels according to another exemplary configuration. As mentioned above, the controller 502 associated with the hospitality location 120 may be implemented in many ways by integrating its functionality with other devices, including the user-profile server 108 of FIG. 1, the entertainment system control 502 of FIG. 5, the device controller 702 of FIG. 7, the central user-profile server 804 of FIG. 8, the content provider 810 of FIG. 8, the local user-profile server 838 of FIG. 8, the STBs 822, 832, 922 of FIG. 8-9, the user-profile server 906 of FIG. 9, the entertainment devices 1022 of FIG. 10, and/or the dynamic guest related selection criteria module 1004 of FIG. 10. For illustration purposes, FIG. 12 is directed at multi-device hospitality location 500 as shown in FIG. 5, but similar actions could also be taken by other configurations of the controller. Generally speaking, the actions of FIG. 12 are broken into three phases: a first phase 1202 performed before the user begins to use the system 500, a second phase 1204 performed while the user is using the system 500, and a third phase 1206 performed after the user has finished using the system 500 and moved to subsequent location(s) 120.

Before the user begins to use the system (the first phase 1202), the entertainment system controller 502 at the location 120 receives a reservation for the user (step 1210), downloads the user profile 200 from the user-profile server 108 (step 1212) and prepares for the user's arrival by gathering content that is scheduled for future viewing by the guest (step 1214). Gathering user-desired content may include scheduling the local controller 502 to record content desired by the guest when the desired content is available from a local content source 508, or downloading content that is stored at the central content storage 102 or remote content sources 106 that may be desired by the user. These actions may also be used to prepare for the user to finish content that may have been started at prior locations 120. At steps 1216 and 1218, the controller 502 may also monitor alerts corresponding to changes of the user's desired content such as may occur when the user begins or finishes a movie, or schedules or cancels a recording while using an entertainment device 510 at a different hospitality location 120. When an alert is received, the controller 502 may update the user profile according to the alert at step 1220 and then adjust the content preparation by returning to step 1214.

While the user is using the system 500 at the current location (the second phase 1204), the controller 502 tailors one or more entertainment devices 510 for the guest according to the user profile 200 (step 1222); and tracks usage and keeps the user profile 200 up to date according to the usage (step 1224). Additionally, the controller 502 sends a notification to the user-profile server 102 when any events or actions by the user occur that may affect the user's entertainment experience at future locations 120 (steps 1226, 1228). These actions and events may include starting a movie, pausing or otherwise stopping (deliberately or accidentally) a movie midway through, finishing a movie, scheduling new content for recording, changing user profile 200 preferences, etc. Similar actions for different types of content other than movies may also be included. For example, notification regarding the user's Internet state, music playback, video game state, etc., may all be sent to the user-profile server 108.

As indicated at step 1230, after the user has finished using the system 500 at the current location 120, the process enters the third phase 1206. A final updated user profile 200 may be sent to the user-profile server 108, and any user-desired content that is only available at this location may also be sent, when ready (e.g., after recorded and/or requested), to the central content storage 102 or another hospitality location 120 so that the user may utilize the content at one or more future locations 120 (step 1232). Finally, unneeded user-specific content stored in the local content storage 520 may be deleted (step 1234), and statistics such as billing and/or usage information may be prepared (step 1236).

FIG. 13 shows an operational flowchart 1300 of actions taken by a central user-profile server 108 to provide a user-tailored experience while a user travels to different hospitality locations 120 according to an exemplary configuration. The central user-profile server 108 receives information such as itinerary for a user's trip from a reservation system (step 1310) and updates the corresponding user profile 200 for the user to include all the various hospitality locations 120 at which the user is planning to stay on a trip plan 400 (step 1312). The trip plan 400 may also be updated during the trip if needed such as when the user changes their itinerary or gets delayed, etc. Depending on what user-specific content is indicated on or determined from information included within the user profile 200, and according to what content and capabilities are available at the locations 120 on the trip plan 400, the central user-profile server 108 may schedule the central recording and distribution system 104 to record user-desired content from the remote content sources 106 that is not already locally available at all the locations 120 the user will visit (steps 1314, 1316). The central user-profile server 108 may query one or more locations 120 on the user's trip plan 400 in order to determine if they already have access to specific content.

Regional preferences 220 may also be taken into account. For example, if at least one of the locations 120 on the trip plan 400 does not have the capability to record the news from a region indicated by the region preferences 220 of the user profile 200, the central user-profile server 108 may schedule the central recording system 104 or a local entertainment system controller 502 to record a news program from one or more of the region(s) indicated in the region preferences 220. Then, while the user is at a foreign location 120 where the region-specific content is not available such as a hotel in a foreign country, the entertainment device 510 utilized by the user may play the news program as streamed from the central content storage 102 or from another location 120 having access to the news program. Alternatively, a controller 502 at a location 120 on the trip plan 400 may pre-download the news program as soon as it is available. This may be beneficial to have the news program ready for viewing by the user when real-time streaming is not possible (e.g., due to bandwidth considerations).

The central user-profile server 108 may also receive notifications from the various locations 120 pertaining to changes to the user's profile 200 that may affect future locations 120 on the trip plan 400 (step 1318). The user profile 200 may be updated (step 1320), and, if required, alerts corresponding to the changes in the user profile 200 may be sent down to the future locations 120 on the trip plan 400 (steps 1322 and 1324). For example, if a user schedules a recording of some live content while at a first location 120a, if a second location 120b also has access to this live content, the alert may notify the second location 120b to record the live content so the user may watch it upon arrival. On the other hand, if the live content is not available at one of the future locations 120, the central user-profile server 108 may reschedule the central recording system 104 to record the content so it may be viewed later from the location(s) at which it would not otherwise be available. Likewise, if the user finishes watching the live content at one location 120a, the alert may instruct future locations according to the trip plan 400 to delete the recording of the live content since the user is finished with it.

Similarly, the user-profile server 108 may reschedule the central recording system 104 or one of the local entertainment system controllers 502 when the notification pertains to a change in the scheduled recordings by the user (steps 1326, 1328) User specific content no longer needed as a result of the notification may be deleted (step 1330).

When the user's trip is finished (step 1332), the central user-profile server may delete unneeded user-specific content stored on the central content storage 102 (step 1334) and calculate statistics such as billing or usage information (step 1336).

Users who travel during unplanned trips may also benefit from the present invention. For example, a user may login at an entertainment device 510, 700, 822, 832, 1022 or begin entertainment usage at any hospitality location 120. An entertainment device controller 502 associated with the location 120 may automatically retrieve the user's profile 200 and customize settings/content in real-time according to the user's profile 200. This may include allowing the user to finish content or other unfinished actions that were started at previous locations. In order to identify the user, the entertainment device 510, 700, 822, 832, 1022 may query for a user ID number and then customize on the fly. This is useful for locations 120 that do not accept reservations or if the user spontaneously visits a particular location 120 without making a trip plan 400. In another configuration, the user may carry a GPS or other location-aware portable device that sends periodic location updates to the user-profile server 108. The user-profile server 108 may then send alerts to locations 120 within a predetermined distance from the current location of the user according to the GPS notification. In another example, the locations may detect an identifier of a device carried by the user such as a wireless mobile phone GSM SIM card ID, laptop WiFi MAC address, or radio-frequency identification (RFID) tag. In this way, controllers of locations within the vicinity of the user may automatically identify the user, download the corresponding user profile from the user-profile server, and prepare for use by the user without the user having to plan a trip in advance.

Unfinished pay-per-use or pay-per-time activities may also automatically carry over to future locations. For example, an unused duration of high speed internet access (HSIA) may be automatically carried forward to future locations 120. Upon actual usage by the user at a later location, billing may be automatically prorated such that each location receives the correct portion of the user's payment. Payment splitting may be facilitated by the user making the payment at the user-profile server 108, and then the user-profile server 108 distributing the payments to each location 120 in the correct proportions. In one configuration, the user profile 200 may further include a "credits" section indicating remaining credit on the user's account. In another configuration, the user profile 200 may include billing information such as a user's credit card number.

Electronic bookmarks 212 for content may be created (automatically or manually) with at least three options: None, Local, Global. "None" may mean that content is not bookmarked and the user does not wish to continue at future locations 120. "Local" may mean that the content is bookmarked but only at the current location 120. In this case, no notification needs to be sent from the current location to other locations (or the user-profile server 108) because the user does not wish to finish the content at other locations. "Global" may mean the content is bookmarked and notifications are sent to the future locations on the trip plan (for example, via the user-profile server 108 or sent direct to the future locations if known) to retrieve the bookmark and gather the content (if necessary) so the user may finish the content at one or more of the future locations 120. The user may set bookmarking preferences on the user profile 200, or a popup message may appear giving the user the three bookmarking options when the user stops playing content. Other bookmarking options are also possible such as only within a certain group or type of locations 120, for example.

Automatic tagging of content genres and other characteristics may be performed by the content sources 106, 508 and the user-profile server 108. This may help each location 120 match content to user preferences. As a user views different content, the user profile 200 may track the various genres and other tags of the content played by the user. Depending on the genre, language, region, and other tags that the user has previously enjoyed, new content may be automatically suggested to the user having similar tags. Promotion and advertisements may also be targeted to interested users using the tagging information in the user profile 200. Content identification may be utilized so that each location 120 may automatically determine if it has access to user-desired content from local content sources. The user-profile server 108 may also keep track of which locations 120 have access to which content in order to automatically determine where to send alerts to gather newly requested user-desired content. The controller 502 may automatically send alerts only to locations associated with the user that have not already gathered the user-desired content. Filtering may also be incorporated so that users can automatically erase or hide certain genres, both from the content that is shown as available at each location 120 and from the user profile 200.

The user may need to be authenticated at each location before downloading unfinished or other user-specific content, e.g., for licensing reasons. This authentication may be done with a combination of the user identifier and their travel documents such as passports. Although possible to make identification easier, it is not necessary that all users carry with them a system-wide unique number. Instead, a user identification number may be a location-specific number such a guest number at a particular hotel. Combined with the guest's name, the user-profile server 108 may have a mapping 210 of various location-specific guest numbers to a system-wide unique user number that corresponds to a particular user's profile (e.g., the user profile 200 corresponds to user identifier #3,453,292 in FIG. 2). In this way, the guest may still participate in local loyalty programs at individual hotels, airlines, etc. The central server may keep track of which local loyalty program numbers are associated with each user. In one configuration, the user need not be aware of their global user identifier number associated with their user profile 200. Other user-specific information such as e-mail addressees, GSM SIM card number, phone numbers, etc may be used as a part of automatic user authentication.

Content transferred from one location 120 to another location 120 (or to the central content storage 102) may be encrypted such that it is only playable by the particular user. The user may be identified by a combination of a user identification number and the user's name as verified by their travel documents at each location. Public and private keys may be stored in the user profile 200. The user-profile server 108 may issue the user's public key to a particular location 120 to encrypt content to the user. When the user authenticates at another location 120, the private key may be used by the user at that location 120 to decrypt the content.

For copyright protection, user-specific content may be cleared from subsequent locations once finished by a user. Alternatively, the option to clear content on subsequent locations may be a user or system settable such as by setting a timer. For example, all user-specific content may viewable once in a period of time such as 24-hours, and then automatically deleted.

One usage example involves available content being dynamically selected according to guest related customization criteria so that content that is going to be useful or interesting to the guests is made available at a hotel. Required hotel hardware and bandwidth are both beneficially reduced by being able to dynamically select and make available the content that is going to be desired by current guests. In another example, a guest's settings and usage histories made during previous stays at other locations and/or other devices is utilized to enhance their stay at different locations in the future. In this way, the configurations, customizations and other repetitive tasks that may be required by guests as the move from entertainment device to entertainment device are minimized.

In summary, a user-profile server may manage a user profile storing preferences and settings associated with a user. A controller of an entertainment device associated with the user may retrieve the user profile and adjust content available at the entertainment device according to the profile. Content may be gathered in advance by the controller so it is ready at the entertainment device when the user begins. The content may be customized for just the user or for multiple users at one location. The controller may track usage and notify the user-profile server when the usage may affect the user's experience at other locations. The user-profile server may send alerts to entertainment device controllers at other locations associated with the user so the other controllers may prepare content. The other locations may be associated with the user in the form of a trip plan indicating a sequence of planned locations by the user. A hospitality media system may include a plurality of entertainment devices installed at a hospitality location and a content selector. The content selector is configured to retrieve a plurality of user profiles corresponding to current users of the hospitality location, and automatically adjust content made available on each of the entertainment devices at the hospitality location according to information stored in the user profiles.

In an exemplary embodiment, a user profile server stores a particular user profile corresponding to a user who belongs to a plurality of separate loyalty programs, and the particular user profile includes a plurality of different loyalty program user identifiers each identifying the user on a respective one of the separate loyalty programs. The user profile server communicates user preferences included on the particular user profile to a first controller via the computer network and communicates the user preferences included on the particular user profile to a second controller via the computer network. The first controller is associated with a first hospitality location where the user is identified according to a first loyalty program user identifier included on the particular user profile, and the second is controller is associated with a second hospitality location where the user is identified according to a second loyalty program user identifier included on the particular user profile.

In an exemplary embodiment, a user profile server stores a user profile corresponding to a user identifier. The user profile includes user-specific information of a user associated with the user identifier. The server receives a location update associated with the user identifier, the location update representing a current location of the user associated with the user identifier and determine a hospitality location within a predetermined distance of the current location represented by the location update. The server communicates at least one of the user-specific information to a controller associated with the hospitality location thereby allowing the controller to provide the user-tailored experience to the user according to the at least one of the user-specific information received from the user-profile server. In this way, users who travel during unplanned trips or to locations that do not accept reservations may benefit from user-tailored experiences.

Although the invention has been described in connection with a preferred embodiment, it should be understood that various modifications, additions and alterations may be made to the invention by one skilled in the art without departing from the spirit and scope of the invention as defined in the appended claims. The above-described exemplary usage scenario is based on a plane 120c and a hotel 120a but in fact any location's associated entertainment device controller may perform similar actions. In the above description, the words "guest" and "traveller" are used as exemplary types of one or more user(s) for illustration purposes; however, the configurations above are also useful for other types of users. Additionally, a "user" associated with a device is meant to represent any person who has, is, or will utilize a device including past, current, and future users. The word "location" is meant as a relative term and may be a moving location such as an airplane, train, bus, car, taxi, spacecraft; or a stationary location such as a hotel, resort, hospital, etc. Sometimes the word "location" also represents an entertainment device, wherein going to a new location means utilizing a different entertainment device.

Although the description of the invention has been generally illustrated using the hospitality and tourism industries as examples, the invention is equally applicable to other industries such as the consumer and automobile industries, in addition to any property, service, or hospitality location wishing to provide users with electronic entertainment including but not limited to hotels, motels, resorts, hospitals, apartment/townhouse complexes, restaurants, retirement centers, cruise ships, busses, airlines, shopping centers, passenger trains, passenger cars, taxi services, etc. An individual user may also find the invention useful to obtain a persistent and personalized entertainment experience across multiple electronic devices. Although beneficial while travelling, travel is not a requirement of the invention. Additionally, the various separate configurations, elements, features, aspects, and modules of the invention described above may be integrated or combined into single units. For example, a high definition television or projector may incorporate the functions of a STB and may therefore act as an entertainment device and/or controller. In another example, the user-profile server 108 may be combined with the trip planning and reservation system 110. In yet another example, the above-described functions of the content selectors 814, 1002 of FIG. 8 and FIG. 10 may be combined with those of the local user-profile server 838 of FIG. 8 and/or the user-profile server 906 of FIG. 9. Similarly, functions of single units may be separated into multiple units. One example involves creating an alert server external to the user-profile server 108 that handles receiving notifications and sending alerts to/from the locations 120 as required. Unless otherwise indicated, the various servers, controllers, selectors, and other devices described above may be implemented by a computer server having one or more processors executing a computer program loaded from a storage media (not shown) to perform the described functions. In addition to a dedicated physical computing device, the word "server" may also mean a service daemon on a single computer, virtual computer, or shared physical computer, for example.

The above description describes elements that may include one or more modules, some of which are explicitly shown in the figures, others that are not. As used herein, the term "module" may be understood to refer to computing software, firmware, hardware, and/or various combinations thereof. It is noted that the modules are exemplary. For example, a processor (not shown) may operate pursuant to instructions stored on a storage medium to provide the functions as described for the modules. The modules may also be combined, integrated, separated, and/or duplicated to support various applications. Also, a function described herein as being performed at a particular module may be performed at one or more other modules and/or by one or more other devices instead of and/or in addition to the function performed at the particular module. Further, the modules may be implemented across multiple devices and/or other components local or remote to one another. Additionally, the modules may be moved from one device and added to another device, and/or may be included in both devices.

Unless otherwise specified, features described may be implemented in hardware or software according to different design requirements. Additionally, all combinations and permutations of the above described features, configurations, and examples may be utilized in conjunction with the invention.

What is claimed is:

1. A method of tailoring user entertainment experience across hospitality locations, the method performed by a user-profile server coupled to a network, the method comprising:
    storing a user profile corresponding to a user identifier in a storage device, the user profile including user-specific information of a user associated with the user identifier;
    receiving via the network a location update associated with the user identifier, the location update representing a current location of the user associated with the user identifier;
    determining a first hospitality location within a predetermined distance of the current location represented by the location update;
    communicating via the network at least one of the user-specific information from the user-profile server to a controller associated with the first hospitality location, wherein the controller is configured to perform at least one operation that includes customizing media content for the user according to information contained in the at least one of the user-specific information;
    receiving from the controller a notification containing information about the at least one operation performed by the controller, the notification corresponding to an updated user profile; and
    sending an alert corresponding to the updated user profile to a controller associated with a second hospitality location, such that the controller associated with the second hospitality location is prepared to provide a user-tailored experience to the user upon arrival at the second hospitality location.

2. The method of claim 1, further comprising receiving the location update as a GPS notification from a location-aware portable device operated by the user.

3. The method of claim 1, wherein the user identifier is an identifier of a device carried by the user.

4. The method of claim 1, further comprising determining a plurality of hospitality locations within the predetermined distance of the current location and sending the at least one of the user-specific information to each of the hospitality locations thereby allowing each of the hospitality locations to provide the user-tailored experience to the user.

5. The method of claim 1, wherein the controller associated with the first hospitality location stores customized media content for the user according to the at least one of the user-specific information prior to arrival of the user at the first hospitality location.

6. The method of claim 1, further comprising:
sending an alert to the first hospitality location in response to determining that the first hospitality location is within the predetermined distance of the current location represented by the location update;
wherein the controller associated with the first hospitality location retrieves the user profile from the user profile server after receiving the alert and customizes media content for providing to the user at the first hospitality location according to the user-specific information on the user profile.

7. A user-profile server for providing a user-tailored entertainment experience across hospitality locations, the user-profile server comprising:
a network connection for coupling the user-profile server to a network;
a storage device; and
one or more processors coupled to the storage device and the network connection;
wherein, by the one or more processors executing software instructions loaded from the storage device, the one or more processors are configured to:
store a user profile corresponding to a user identifier in the storage device, the user profile includes user-specific information of a user associated with the user identifier;
receive via the network a location update associated with the user identifier, the location update representing a current location of the user associated with the user identifier;
determine a first hospitality location within a predetermined distance of the current location represented by the location update;
communicate via the network at least one of the user-specific information from the user-profile server to a controller associated with the first hospitality location, wherein the controller is configured to perform at least one operation that includes customizing media content for the user according to information contained in the at least one of the user-specific information;
receive from the controller a notification containing information about the at least one operation performed by the controller, the notification corresponding to an updated user profile; and
send an alert corresponding to the updated user profile to a controller associated with a second hospitality location, such that the controller associated with the second hospitality location is prepared to provide the user-tailored experience to the user upon arrival at the second hospitality location.

8. The user-profile server of claim 7, wherein the user identifier is an identifier of a device carried by the user.

9. The user-profile server of claim 7, wherein the one or more processors are further configured to determine a plurality of hospitality locations within the predetermined distance of the current location and send the at least one of the user-specific information to each of the hospitality locations thereby allowing each of the hospitality locations to provide the user-tailored experience to the user.

10. The user-profile server of claim 7, wherein:
the user-specific information includes a language preference of the user; and
the controller associated with the first hospitality location provides media content to the user in a language selected according to the language preference.

11. The user-profile server of claim 7, wherein:
the user-specific information includes a region preference of the user; and
the controller associated with the first hospitality location provides to the user media content from a geographical region selected according to the region preference.

12. The user-profile server of claim 7, wherein the controller associated with the first hospitality location stores customized media content for the user according to the at least one of the user-specific information prior to arrival of the user at the first hospitality location.

13. The user-profile server of claim 7, wherein:
the one or more processors are further configured to send an alert to the first hospitality location in response to determining that the first hospitality location is within the predetermined distance of the current location represented by the location update; and
the controller associated with the first hospitality location retrieves the user profile from the user profile server after receiving the alert and customizes media content for providing to the user at the first hospitality location according to the user-specific information on the user profile.

14. The user-profile server of claim 7, wherein:
the updated user profile corresponds to a media content unfinished by the user at the first hospitality location;
the alert includes an electronic bookmark representing a position in the media content corresponding a time point where the user stopped playing the media content; and
the controller associated with the second hospitality location allows the user to play the media content from the position in the media content corresponding to the time point indicated by the electronic bookmark.

15. A system for providing a user-tailored experience across hospitality locations, the system comprising:
a network connection for coupling a user-profile server to a network;
a storage device;
a controller associated with a first hospitality location; and
one or more processors coupled to the storage device and the network connection;
wherein, by the one or more processors executing software instructions loaded from the storage device, the one or more processors are configured to:
store a user profile corresponding to a user identifier in the storage device, the user profile includes user-specific information of a user associated with the user identifier;
receive via the network a location update associated with the user identifier, the location update representing a current location of the user associated with the user identifier;
determine that the first hospitality location is within a predetermined distance of the current location represented by the location update;

communicate via the network at least one of the user-specific information from the user-profile server to the controller associated with the first hospitality location, wherein the controller is configured to perform at least one operation that includes customizing media content for the user according to information contained in the at least one of the user-specific information;

receive from the controller a notification containing information about the at least one operation performed by the controller, the notification corresponding to an updated user profile; and send an alert corresponding to the updated user profile to a controller associated with a second hospitality location, such that the controller associated with the second hospitality location is prepared to provide the user-tailored experience to the user upon arrival at the second hospitality location.

16. The method of claim 5, wherein the controller associated with the first hospitality location records user-desired content that is available from a remote content source prior to arrival of the user at the first hospitality location.

17. The method of claim 5, wherein the controller associated with the first hospitality location downloads content from a remote content source prior to arrival of the user at the first hospitality location.

18. The user-profile server of claim 7, wherein the first hospitality location is a transient hospitality location.

19. The user profile server of claim 7, wherein the second hospitality location is a fixed hospitality location.

20. The user-profile server of claim 7, wherein the controller associated with the second hospitality location dynamically prepares media content that is likely to be of interest to the user prior to arrival of the user at the second hospitality location.

* * * * *